United States Patent
Lanterman et al.

(10) Patent No.: US 12,000,513 B2
(45) Date of Patent: Jun. 4, 2024

(54) QUICK CONNECTOR ASSEMBLY FOR FLUID LINES WITH POSITIVE ASSURANCE FEATURE

(71) Applicant: DLHBOWLES, INC., Canton, OH (US)

(72) Inventors: Scott Lanterman, Tallmadge, OH (US); Alan Romack, Columbia, MD (US); Praveen Pai, Odenton, MD (US); Bryan Fung, Pembroke Pines, FL (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 18/130,982

(22) Filed: Apr. 5, 2023

(65) Prior Publication Data

US 2023/0243451 A1 Aug. 3, 2023

Related U.S. Application Data

(63) Continuation of application No. 17/331,120, filed on May 26, 2021, now Pat. No. 11,649,914.

(60) Provisional application No. 63/051,923, filed on Jul. 15, 2020, provisional application No. 63/029,846, filed on May 26, 2020.

(51) Int. Cl.
*F16L 37/12* (2006.01)

(52) U.S. Cl.
CPC ....... *F16L 37/1225* (2013.01); *F16L 2201/10* (2013.01)

(58) Field of Classification Search
CPC ... F16L 37/0841; F16L 37/0844; F16L 37/12; F16L 37/1225; F16L 37/142; F16L 37/148; F16L 37/14; F16L 37/144; F16L 37/15; F16L 2201/10
See application file for complete search history.

(56) References Cited

U.S. PATENT DOCUMENTS

| | | | |
|---|---|---|---|
| 6,846,021 B2 | 1/2005 | Rohde | |
| 7,390,025 B2 | 6/2008 | Pepe | |
| 7,484,774 B2 | 2/2009 | Kerin | |
| 7,845,684 B2 | 12/2010 | Gaudin | |
| 2012/0211977 A1* | 8/2012 | Callahan | F16L 37/144 285/313 |
| 2013/0307263 A1* | 11/2013 | Parks | F16L 37/144 285/319 |

OTHER PUBLICATIONS

IPRP issued Nov. 17, 2022; International Patent Application PCT/US2021/034254 filed May 26, 2021.

* cited by examiner

*Primary Examiner* — Aaron M Dunwoody
(74) *Attorney, Agent, or Firm* — McDonald Hopkins LLC

(57) ABSTRACT

Provided is a quick connector assembly for joining a male member and a female connector member together to secure fluid communication in a fluid line system. The quick connector assembly includes a primary latch and a secondary latch configured to toggle between engaged and disengaged positions and to allow for a visual, audible, and/or tactile indication as to the status of a secure attachment between a male member and a female connector member.

17 Claims, 19 Drawing Sheets

QUICK CONNECTOR ASSEMBLY FOR FLUID LINES WITH POSITIVE ASSURANCE FEATURE

CROSS REFERENCE TO RELATED APPLICATIONS

This application is a continuation of U.S. patent application Ser. No. 17,331,120 filed on May 26, 2021 which, itself, claims priority to and the benefit of U.S. Provisional Patent Application No. 63/029,846 filed May 26, 2020 and U.S. Provisional Patent Application No. 63/051,923 filed Jul. 15, 2020 each titled "QUICK CONNECTOR ASSEMBLY FOR FLUID LINES WITH POSITIVE ASSURANCE FEATURE." All of the foregoing applications are hereby incorporated by reference in their entireties.

FIELD OF THE INVENTION

The present invention is generally related to a quick connector assembly for fluid line systems that allow for the secure attachment and detachment of connectable fluid lines. In particular, this disclosure relates to providing a latching configuration with a positive assurance feature that indicates to a user that a quick and secure attachment has been achieved.

BACKGROUND

Quick connector assemblies or couplings generally include a female connector configured to receive and sealing retain a male member to provide a fluid connection between two lumens or conduits to establish fluid communication between the two conduits. Quick connector assemblies assist to provide a sealed and secured fluid line with a minimum amount of time and expense.

Known quick connector assemblies include various configurations for securing the male member and female connector. One type of retention mechanism involves use of a retainer inserted through slots formed in the exterior of the female connector. Support members extend through slots positioned in abutting contact between the male member upset and surfaces defining the slots to prevent withdrawal of the male member. Such retainers are often referred to as "horseshoe" retainers. Examples of this type of coupling are found in U.S. Pat. Nos. 6,846,021, 7,390,025, and 7,484,774. These patents are incorporated by reference herein and disclose a secondary or redundant latch that provides additional security against unintentional separation and to confirm that a secure connection has been achieved during the assembly process. U.S. Pat. No. 7,484,774 discloses a redundant latch that is able to independently retain the male member in the female connector. Further, the redundant latch is configured to only be toggled between engaged and disengaged positions only when the male member is fully inserted within the female connector.

The quick connector assembly of the present disclosure provides an alternative to the type of assemblies disclosed by the prior art. The arrangement of the present disclosure provides primary and secondary latching members to secure the fluid communication between the male member and female connector and provides physical, visual, and/or tactile indication that the fluid connection is achieved in a redundantly secured manner.

SUMMARY

The quick connector assembly of the present disclosure provides an alternative to the type of assemblies disclosed by the prior art. In one embodiment, provided is a quick connector assembly comprising a housing having a cavity for receiving a male member and to define a lumen to allow the flow of fluid between the male member and the cavity, a transverse opening that is generally normal relative to the axis along which the flow of fluid is to travel through the cavity. A blocking member positioned in the cavity of the housing and configured to move between a blocking position aligned with the transverse opening and an unblocked position. A primary retaining member having an abutment surface and a biasing member, the primary retaining member slidably disposed within the transverse opening for movement between an engaged position and a disengaged position. A secondary retaining member having an engagement member, the secondary retaining member slidably disposed within the transverse opening for movement between an engaged position and disengaged position when the blocking member is in the unblocked position.

In one embodiment, the abutment surface of the primary retaining member is a ramped surface. The secondary retaining member includes a pair of spaced apart legs that extend along a common direction with the engagement member. The cavity of the housing is configured to receive a male member having an enlarged portion and wherein the primary retaining member and the secondary retaining member are configured to prevent the male member from being released when the primary retaining member and the secondary retaining member are in the engaged position. In an embodiment, the blocking member further comprises a retention sleeve member configured to retain at least one o-ring within the cavity of the housing wherein the retention sleeve member is a single continuous component that includes a base, a bias member and the blocking member. The base may be a generally cylindrical shaped member positioned along an inner surface of the cavity and is configured to receive a portion of the male member and the bias member is a spring member that has a generally cylindrical shape and configured to receive a portion of the male member and to bias the blocking member towards the blocking position. The biasing member of the primary retention member applies a biasing force to maintain the primary retention member in the engaged position when in a static state. The primary retention member may include a ring shaped body that defines a primary cavity configured to receive a portion of the male member, the primary cavity is at least partially defined by the abutment surface and a space wherein the space is configured to receive the blocking member when placed in the blocking position and configured to receive the engagement member of the secondary retention member when the blocking member is placed in the unblocked position. The abutment surface of the primary retention member includes a first abutment surface spaced from a second abutment surface, wherein said space is positioned along the perimeter of the primary cavity and between the first abutment surface and the second abutment surface. The primary bias member includes a pair of elongated legs that extend from a central attachment portion wherein opposing ends of the elongated legs are configured to abut against an outer surface of the housing to impart the bias force thereon. The primary retaining member includes at least one leg member wherein the leg member is configured to bias inwardly toward a primary cavity and to abut against ledges positioned along an inner surface of the housing to allow for a snap fit attachment of the primary retaining member and the housing.

The primary retention member may be received within a primary slot of the transverse opening and the secondary retention member is received within a secondary slot of the transverse opening that is along an opposite side of the housing relative to the primary slot. Alternatively, the primary retention member may be received within a primary slot of the transverse opening and the secondary retention member is received within the primary slot of the transverse opening that is along a common side of the housing relative to the primary slot. In one embodiment, the primary retention member is received within a primary slot of the transverse opening or within a secondary slot of the transverse opening and the secondary retention member is received within the other of the primary slot or secondary slot of the transverse opening.

In another embodiment, provided is a quick connector assembly comprising a housing having a cavity for receiving a male member and to define a lumen to allow the flow of fluid between the male member and the cavity, a transverse opening that is generally normal relative to the axis along which the flow of fluid is to travel through the cavity. A retention sleeve member that includes a base, a bias member and a blocking member wherein the base is a generally cylindrical shaped member positioned along an inner surface of the cavity and the bias member is a spring member that has a generally cylindrical shape and configured to bias the blocking member towards a blocking position aligned with the transverse opening and allow the blocking member to be moved to an unblocked position. A primary retaining member having an abutment surface and a biasing member, the primary retaining member slidably disposed within the transverse opening for movement between an engaged position and a disengaged position. A secondary retaining member having an engagement member, the secondary retaining member slidably disposed within the transverse opening for movement between an engaged position and disengaged position when the blocking member is in the unblocked position. The retention sleeve member may be a single continuous component made or formed from a single piece of material such as a polymer based material. In an embodiment, the primary retention member includes a ring shaped body that defines a primary cavity configured to receive a portion of the male member, the primary cavity is at least partially defined by the abutment surface and a space wherein the space is configured to receive the blocking member when placed in the blocking position and configured to receive the engagement member of the secondary retention member when the blocking member is placed in the unblocked position.

In another embodiment, provided is a quick connector assembly comprising a housing having a cavity for receiving a male member and to define a lumen to allow the flow of fluid between the male member and the cavity, a transverse opening that is generally normal relative to the axis along which the flow of fluid is to travel through the cavity. A blocking member positioned in the cavity of the housing and configured to move between a blocking position aligned with the transverse opening and an unblocked position. A primary retaining member having an abutment surface and a biasing member, the primary retaining member slidably disposed within the transverse opening for movement between an engaged position and a disengaged position wherein the primary retention member includes a ring shaped body that defines a primary cavity configured to receive a portion of the male member, the primary cavity is at least partially defined by the abutment surface and a space wherein the space is configured to receive the blocking member when placed in the blocking position and configured to receive an engagement member of the secondary retention member when the blocking member is placed in the unblocked position. A secondary retaining member having the engagement member, the secondary retaining member slidably disposed within the transverse opening for movement between an engaged position and disengaged position when the blocking member is in the unblocked position. The blocking member further comprises a retention sleeve member configured to retain at least one o-ring within the cavity of the housing and wherein the retention sleeve member is a single continuous component that includes a base, a bias member and the blocking member. The base may be a generally cylindrical shaped member positioned along an inner surface of the cavity and is configured to receive a portion of the male member and the bias member may be a spring member that has a generally cylindrical shape and configured to receive a portion of the male member and to bias the blocking member towards the blocking position.

BRIEF DESCRIPTION OF THE DRAWINGS

The disclosed assembly may be better understood by reference to the following detailed description taken in connection with the following illustrations, wherein.

DETAILED DESCRIPTION

Reference will now be made in detail to exemplary embodiments of the present disclosure, examples of which are illustrated in the accompanying Figures. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

The present assembly described in this application involves embodiments of a multiple latch quick connector assembly for use in selectively attaching a male member to a housing within a fluid line system. The housing may be considered a female connector member herein. It is contemplated to establish a releasable and secure connection between a rigid tube and other fluid carrying components, particularly a flexible hose. However, the quick connector assembly has numerous other applications where a fluid tight, but releasable connection is desired, such as connection of rigid elements of a fluid path, whether pressurized, or unpressurized. One example is for use in automotive fluid delivery systems. However, the quick connector assembly may find utility in any environment in which a first fluid line is to be connected to a second fluid line. Such environments include, without limitation, airplanes, locomotives and ships. Other environments include factory, commercial and residential areas.

Figure 2:
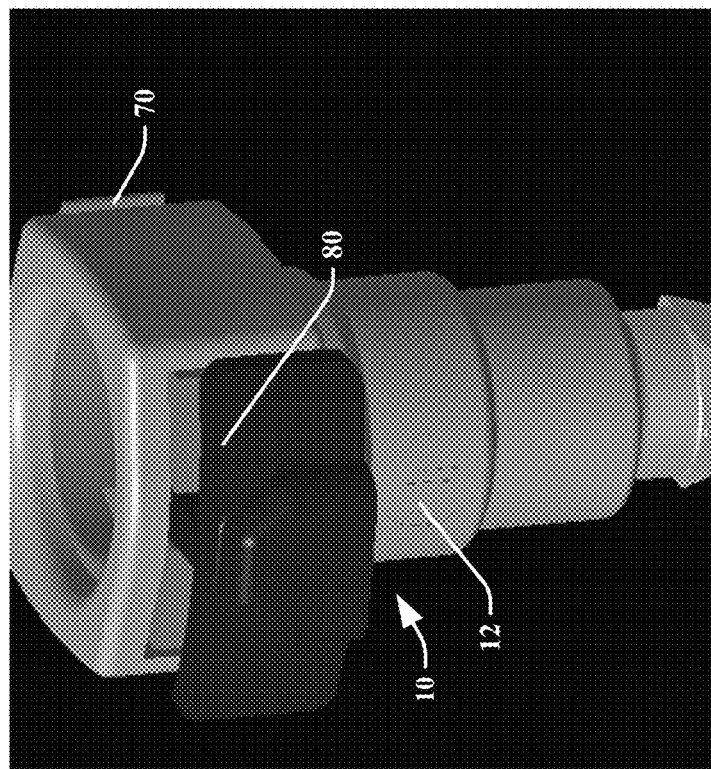
FIG. 2 is a side perspective view of the housing of FIG. 1.
Figure 1:
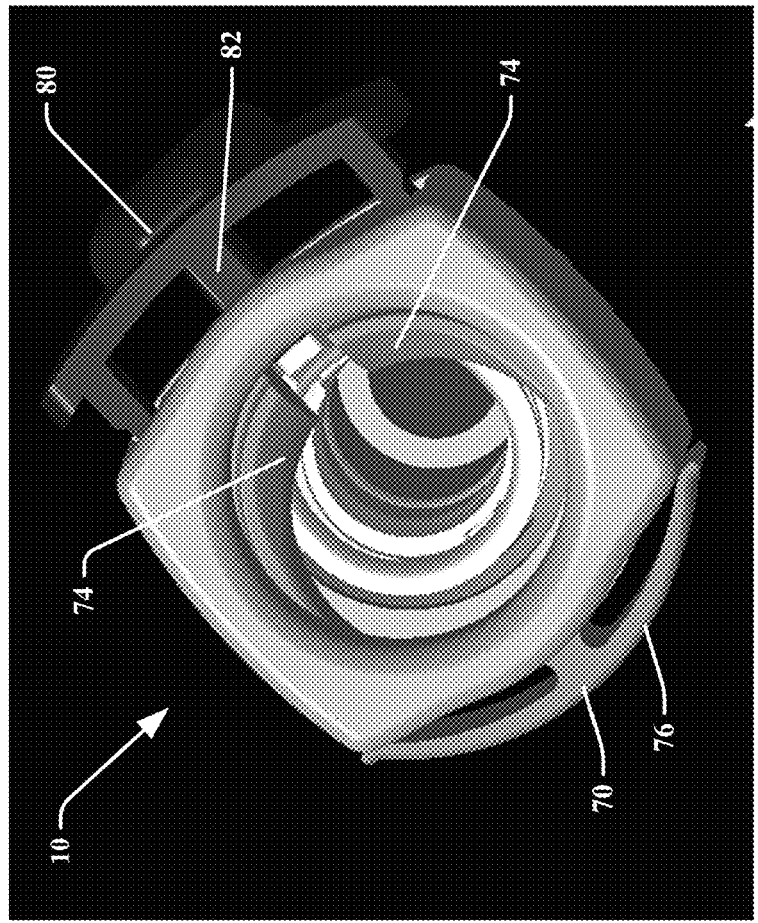
FIG. 1 is a perspective view of an embodiment of a quick connect assembly having a primary latch and secondary latch positioned along opposing sides of a housing of the present disclosure.

FIGS. 1-14 illustrate an exemplary embodiment of the quick connector assembly 100 of the instant application. More particularly, FIGS. 1 and 2 illustrate the female connector or housing 10 that includes a primary latch 70 and a secondary latch 80. The housing 10 defines a cavity configured to receive a male member 90 therein to allow for the transfer of fluid therebetween. Here the secondary latch 80 is illustrated in the disengaged position or open position and no male member 90 is shown. The female connector 10 includes a generally cylindrical connector body 12 and the male member 90 is configured to be releasably secured together by the primary latch member 70 and by a separate and redundant secondary latch member 80. The male member 90 (is illustrated by FIGS. 7 and 8) may be a generally elongated shaped body with a rigid construction that defines a lumen for the transport of fluid therein. The male member 90 may be generally cylindrically and form a part of a fluid line system. In use, the female connector 10 is connected to a tubing or hose which is also a part of the fluid line system and which is opposite from the attachment of the female connector 10 with the male member 90. The female connector 10 and the male member 90 may be connectable to form a permanent, but selectively attachable and detachable, joint in a fluid line system.

As illustrated by FIGS. 7 and 8, the male member 90 includes an enlarged portion 140 along its outer surface. The enlarged portion 140 may include a cross sectional perimeter shape that is larger than a cross sectional perimeter shape of the remaining portions of the male member 90. The enlarged portion 140 may be an annular shoulder that defines a radial abutment surface or an upset at a given distance from an open end or tip 150 of the male member.

Figure 6:
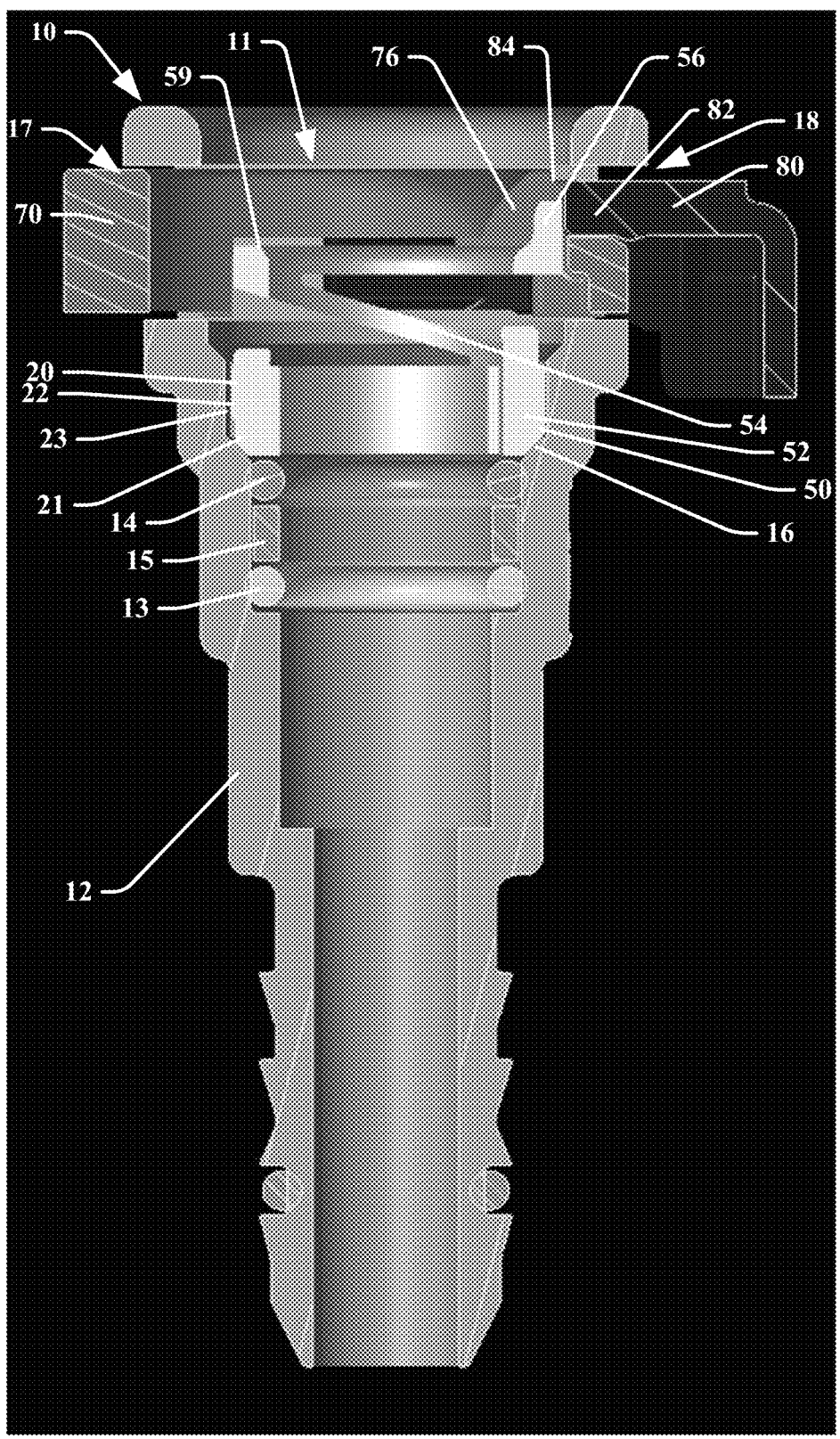
FIG. 6 is a longitudinal cross sectional view of the housing of the quick connect assembly of the present disclosure.
Figure 7:
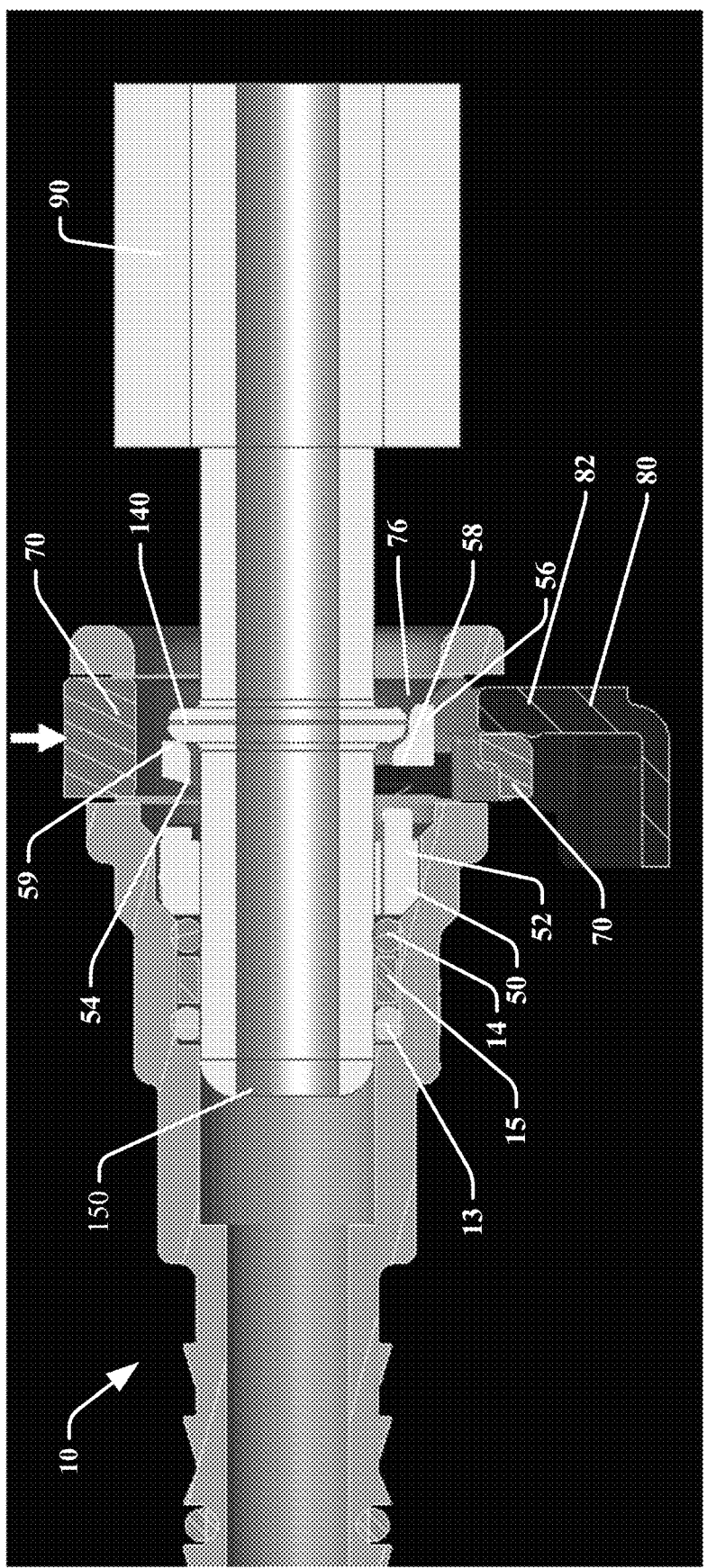
FIG. 7 is a longitudinal cross sectional view of a male member translating to be positioned within the housing with a primary latch and a secondary latch in an opened/disengaged position according to the present disclosure.
Figure 8:
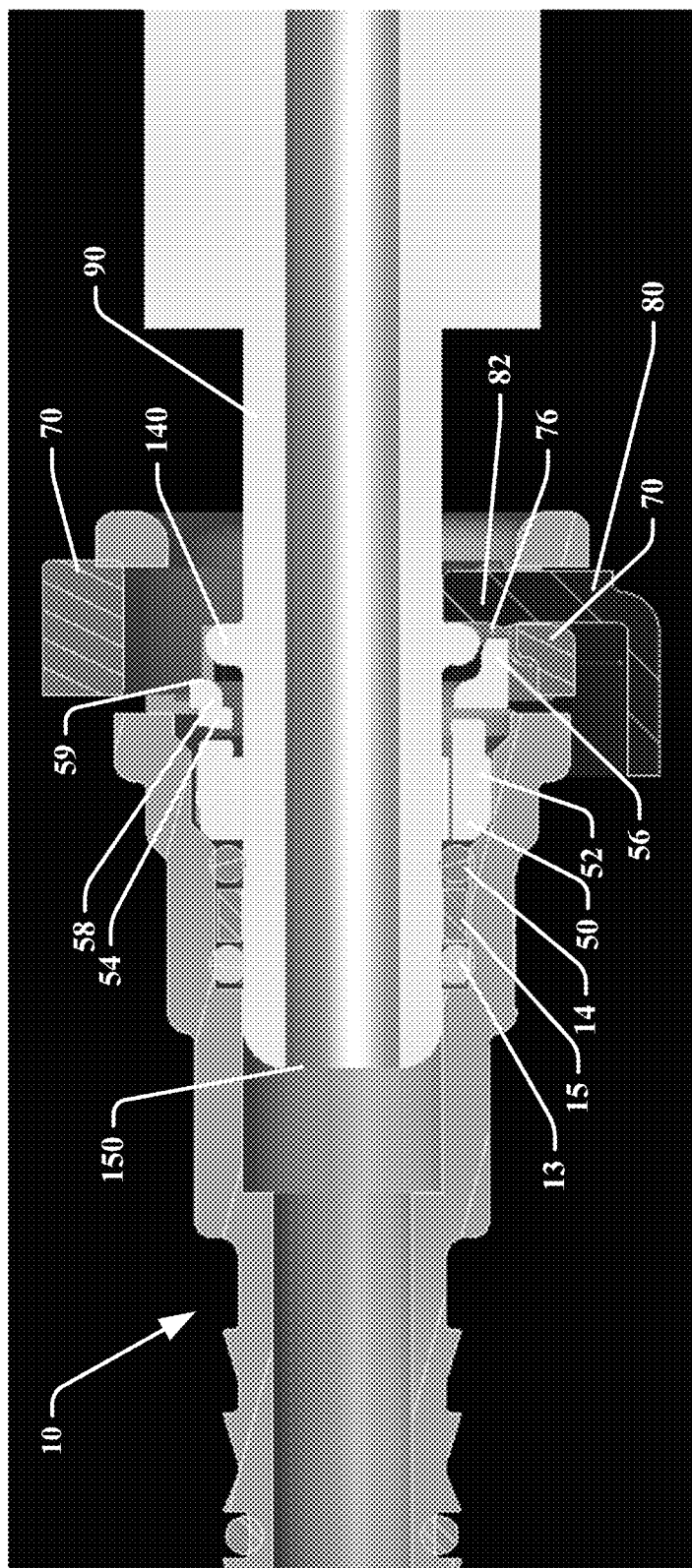
FIG. 8 is a longitudinal cross sectional view of the male member positioned within the housing with the primary latch and the secondary latch in a closed/engaged position according to the present disclosure.

An embodiment of the female connector member or housing 10 is illustrated further detail in FIGS. 3 and 6-8, wherein the female connector 10 includes a cavity 11 that is defined by a generally cylindrical, stepped radially inner surface as illustrated by FIG. 6. The illustrated housing and related components may be preferably molded of a plastic or polymer material or made by additive manufacturing techniques but the materials and manner of manufacturing these components is not limited. It may also be understood that the female connector 10 may take any desired shape without departing from the disclosure and could include a 90° bend or other configuration which is a common shape for a female connector for a quick connect assembly.

Figure 3:
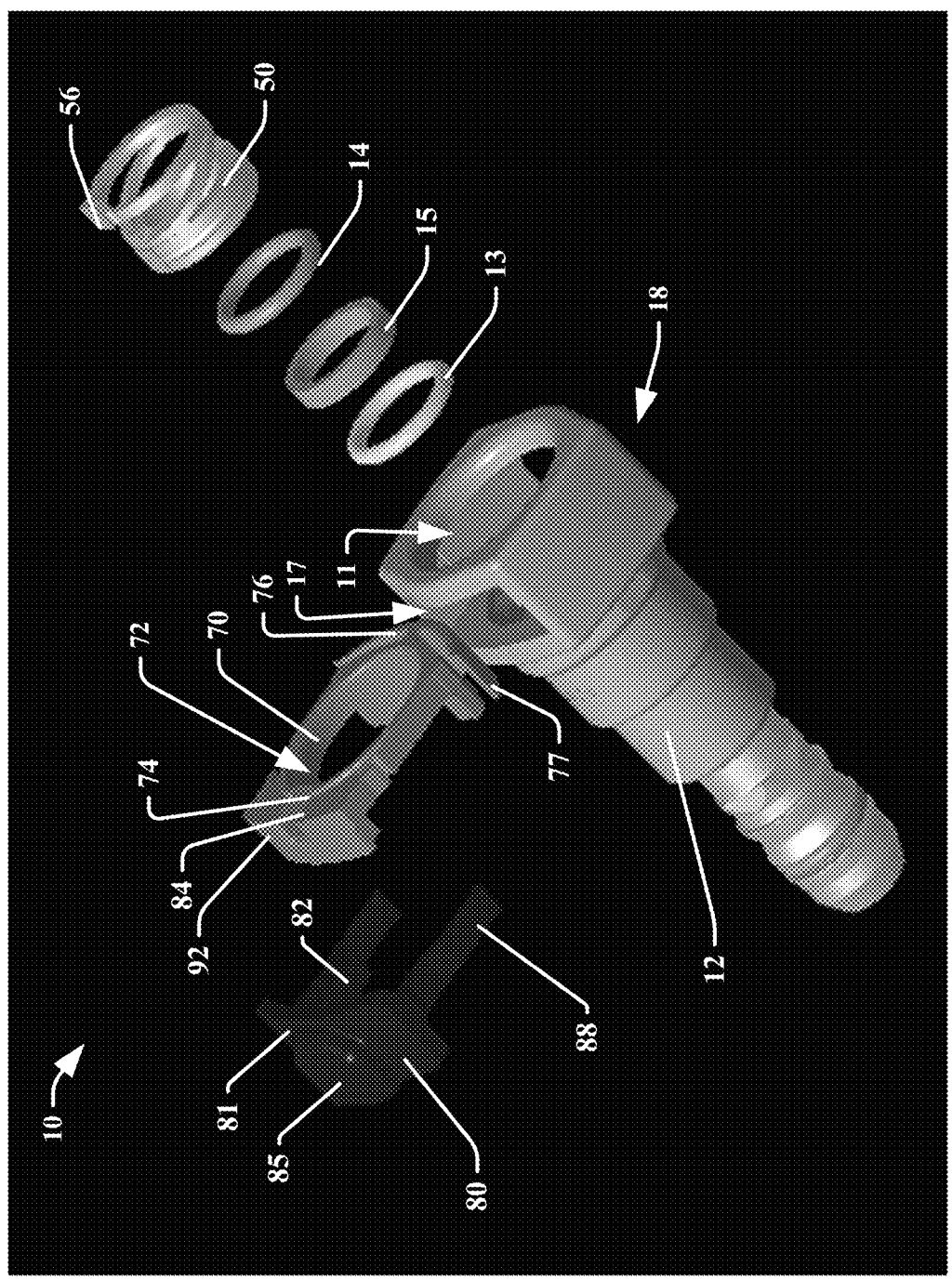
FIG. 3 is an exploded view of the housing of FIG. 1.

FIG. 3 illustrates an exploded view of the female connector or housing 10 along with associated components configured to be arranged therein. The components include a plurality of various shaped O-rings positioned axially along the direction of fluid flow or along an axis of abutment between the male member 90 and housing 10 to assist with a secure engagement and to allow rotatable movement of the male member 90 relative to the female member once engagement is achieved. These associated components may include a tube O-ring along an outer surface of the housing, a first O-ring 13, a second O-ring 14, a retention sleeve 15, a retention sleeve member 50, the primary latch 70, and the secondary latch 80. Notably, these elements may be configured to be aligned along the fluid flow axis which is the desired direction of fluid flow therein as illustrated in FIGS. 6-8.

Figure 4:
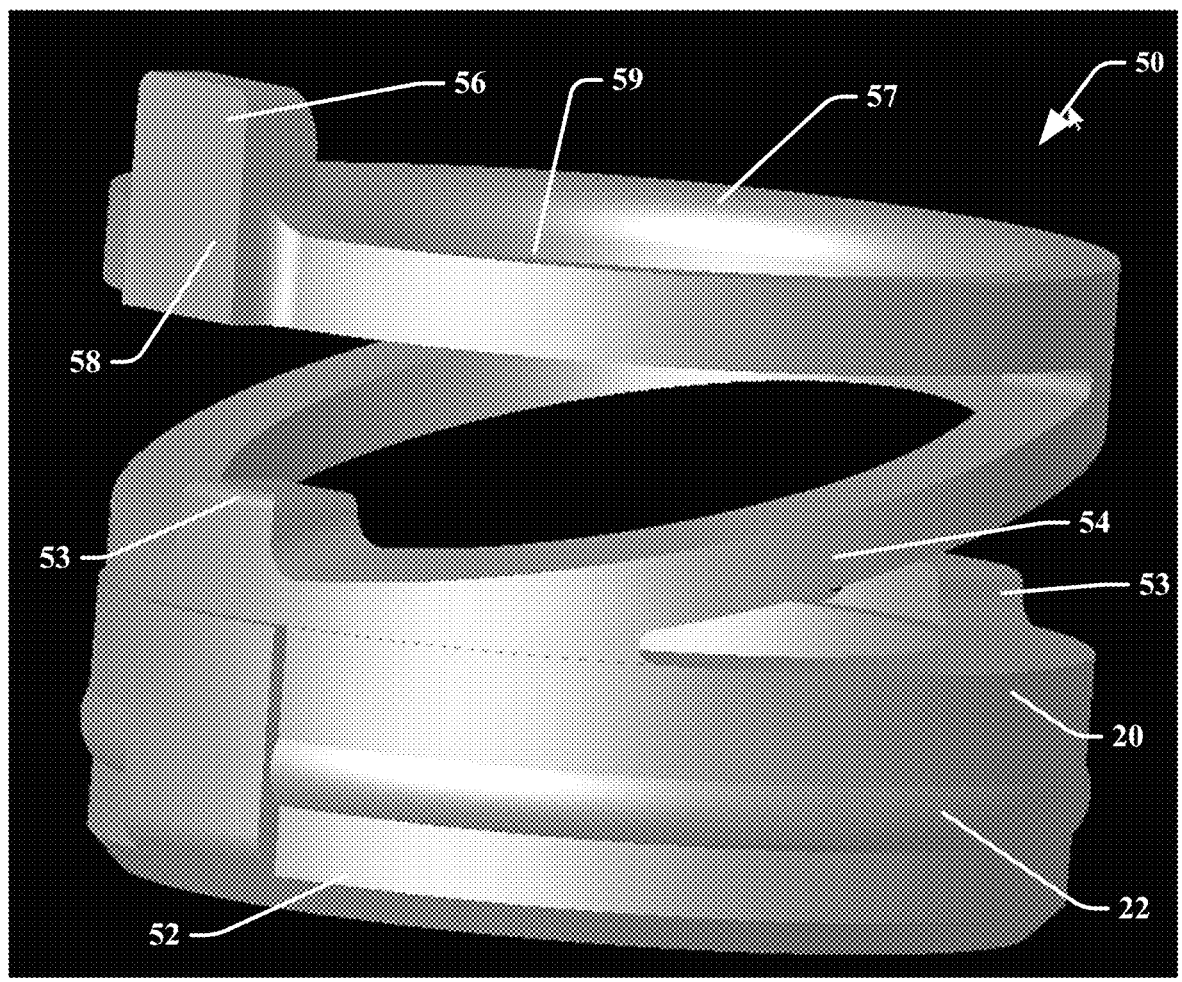
FIG. 4 is a perspective view of an embodiment of a retention sleeve member configured to be positioned in the housing of the instant disclosure.
Figure 5:
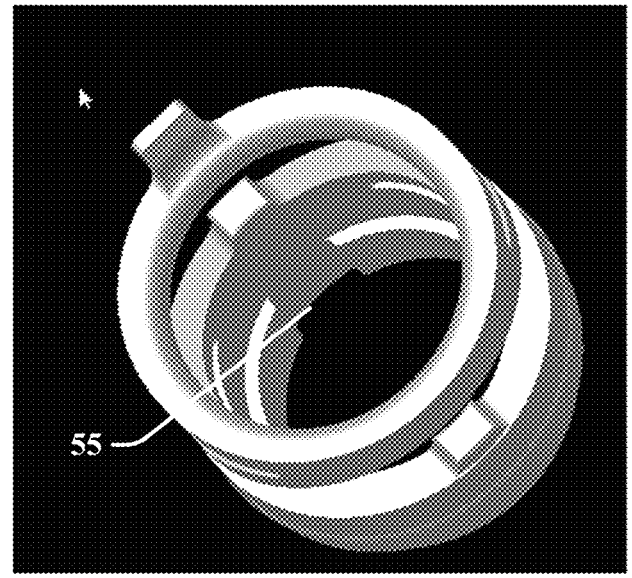
FIG. 5 is a top perspective view of another embodiment of a retention sleeve member configured to be positioned in the housing of the instant disclosure.

Embodiments of the retention sleeve member 50 are illustrated in the enlarged views of FIGS. 4 and 5. The retention sleeve member 50 may be configured to retain at least one O-ring within the female connector. The retention sleeve member 50 may include a base 52 that includes a generally cylindrical and hollow configuration defined to sit within the cavity 11 defined by the female connector 10 and to retain the O-rings 13 and 14 and the retention sleeve 15 within the female connector 10. The base 52 may abut with or sit against an inner radial or shoulder portion 16 (FIG. 6) along an inner surface of the cavity 11 of the female connector 10 and the base 52 may also be configured to receive a portion of the male member 90 therein. Further, at least one spacer 53 may be placed along the base 52 at a predetermined height. The spacer 53 may abut against an underside of the blocking member 56 when it is biased in the unblocking position. The dimensions of the spacer 53 can be modified to change the dimension that allows the blocking member 56 to be biased. Further, the retention sleeve member 50 may include a notch 55 along its underside to assist with placing the retention sleeve member 50 along the correct location within the cavity 11 and to ensure that the blocking member 56 is aligned with the space 84 of the primary latch 70 and the secondary engagement member 82 of the secondary latch 80.

A biasing portion 54 may be attached to the base 52 and include a blocking member 56. The biasing portion 54 of the retention sleeve member 50 may be a spring member that is attached to or generally continuous from the base 52 of the retention sleeve member 50 which may also include a cylindrical shape configured to receive a portion of the male member 90. The retention sleeve member 50 may be a single continuous component or may be formed of various components configured to both bias and retain as described herein. The biasing portion 54 may extend from the base 50 along an opposite side from the O-rings 13, 14, and retention sleeve 15. The biasing portion 54 may be positioned within the cavity 11 of the female connector 10 to be aligned to interact with the secondary latch 80 as illustrated and described. More particularly, the biasing portion 54 may at least partially extend axially from the base 52 to be in alignment with a transverse opening that extends transversely through the housing relative to the cavity 11. The transverse opening may extend along a direction that is generally normal relative to the axis along which the flow of fluid is to travel through the cavity 11. The transverse opening may include primary slot 17 positioned along a first side of the housing 10 and a secondary slot 18 along an opposite second side of the housing 10. The transverse opening is configured to receive the primary latch 70 and secondary latch 80, respectively. In one embodiment, the primary latch 70 is received within the primary slot 17 of the transverse opening and the secondary latch 80 is received within the secondary slot 18 of the transverse opening.

The retention sleeve member may have an outer surface 20 that includes a protrusion 22 configured to abut against and be generally retained within a recess 23 positioned along an inner surface 21 of the cavity 11 in the female connector 10 to retain the retention sleeve member 50 therein.

The blocking member 56 may extend from the biasing member 54 and be configured to bias between a blocking position and a non-blocking position. In the blocking position, the blocking member 56 is configured to prevent the secondary latch 80 from moving into an engaged position or closed position. Here, the blocking member 56 may extend to abut or interfere with a secondary engagement member 82 that extends from the secondary latch 80 and is positioned within the secondary slot 18. The blocking member 56, when positioned in the blocking position, prevents the secondary latch 80 from translating to an engagement position within the secondary slot 18. The biasing member 54 when in the static position, positions the blocking member 56 in the blocking position. As such the blocking member 56 extends from the biasing portion 54 to be positioned in the blocking position in alignment within the secondary slot 18. Additionally, in an embodiment, the blocking member 56 may include a plate 57 and a ring portion 58 wherein the plate 57 may extend from the ring portion 58 and the ring portion 58 may include an opening therein configured to receive and allow a portion of the male member 90 to extend therethough. Additionally, the plate 57 or ring portion 58 of the blocking member 56 may include a surface 59 configured to abut the enlarged portion 140 of the male member 90 such that as the male member 90 translates into the cavity 11 of the housing 10, the enlarged portion 140 is configured to abut the surface 59 of the retention sleeve member 50 and bias the blocking member 56 to the non-blocking position. Here, the blocking member 56 is biased against the force of the bias member 54 towards the base 50 and out of alignment with the secondary slot 18 or thereby clearing a path of translation for the secondary latch 80. In particular, the blocking member 56 may be moved out of alignment with the secondary latch 80 to allow the secondary latch to be moved into the engaged position to lock the male member 90 in place.

Figure 14:
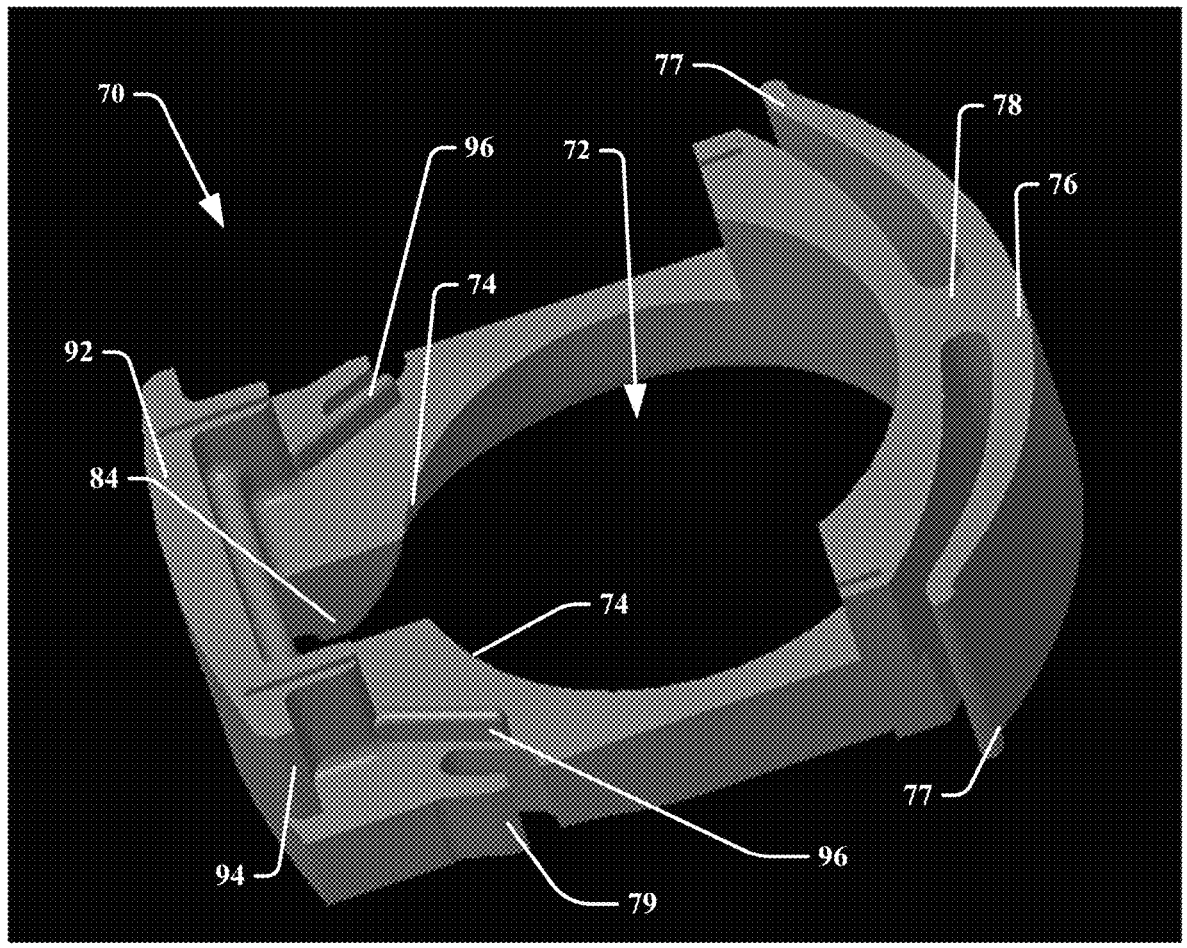
FIG. 14 is a perspective view of the primary latch according to the present disclosure.
Figure 16:
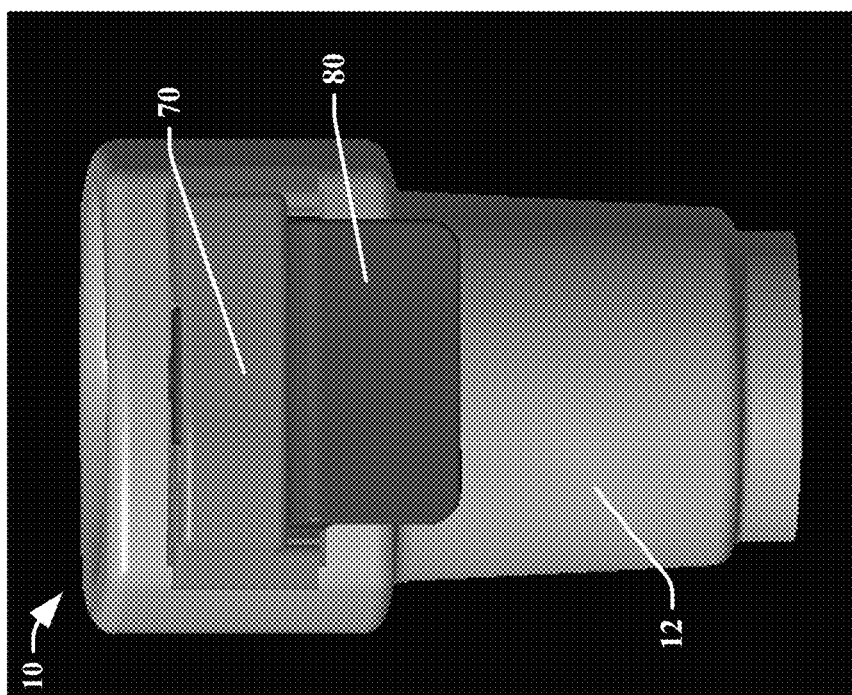
FIG. 16 is a side view of the housing of FIG. 15.
Figure 15:
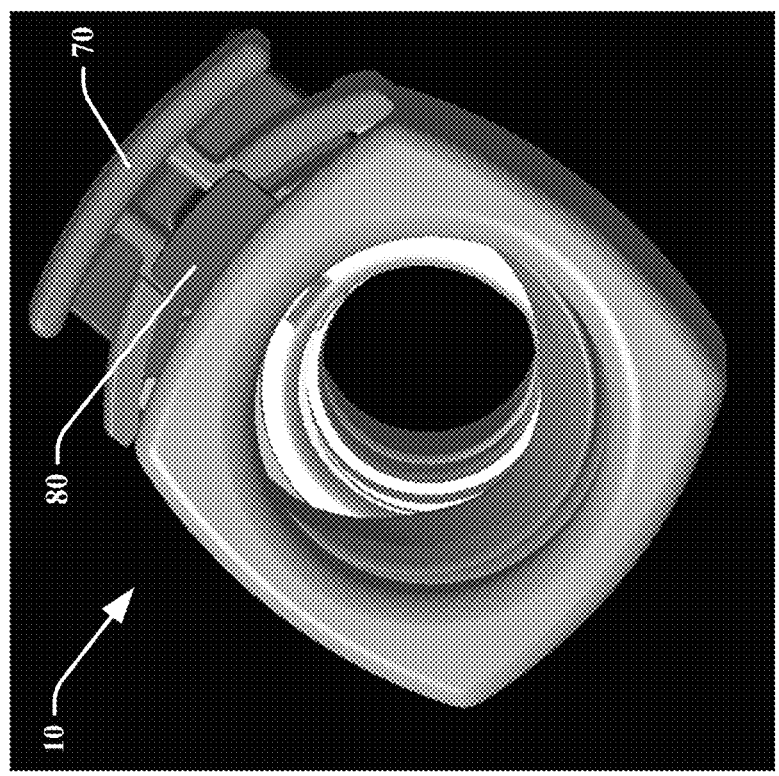
FIG. 15 is a perspective view of another embodiment of a quick connect assembly having a primary latch and secondary latch positioned along a common side of a housing of the present disclosure.
Figure 17:
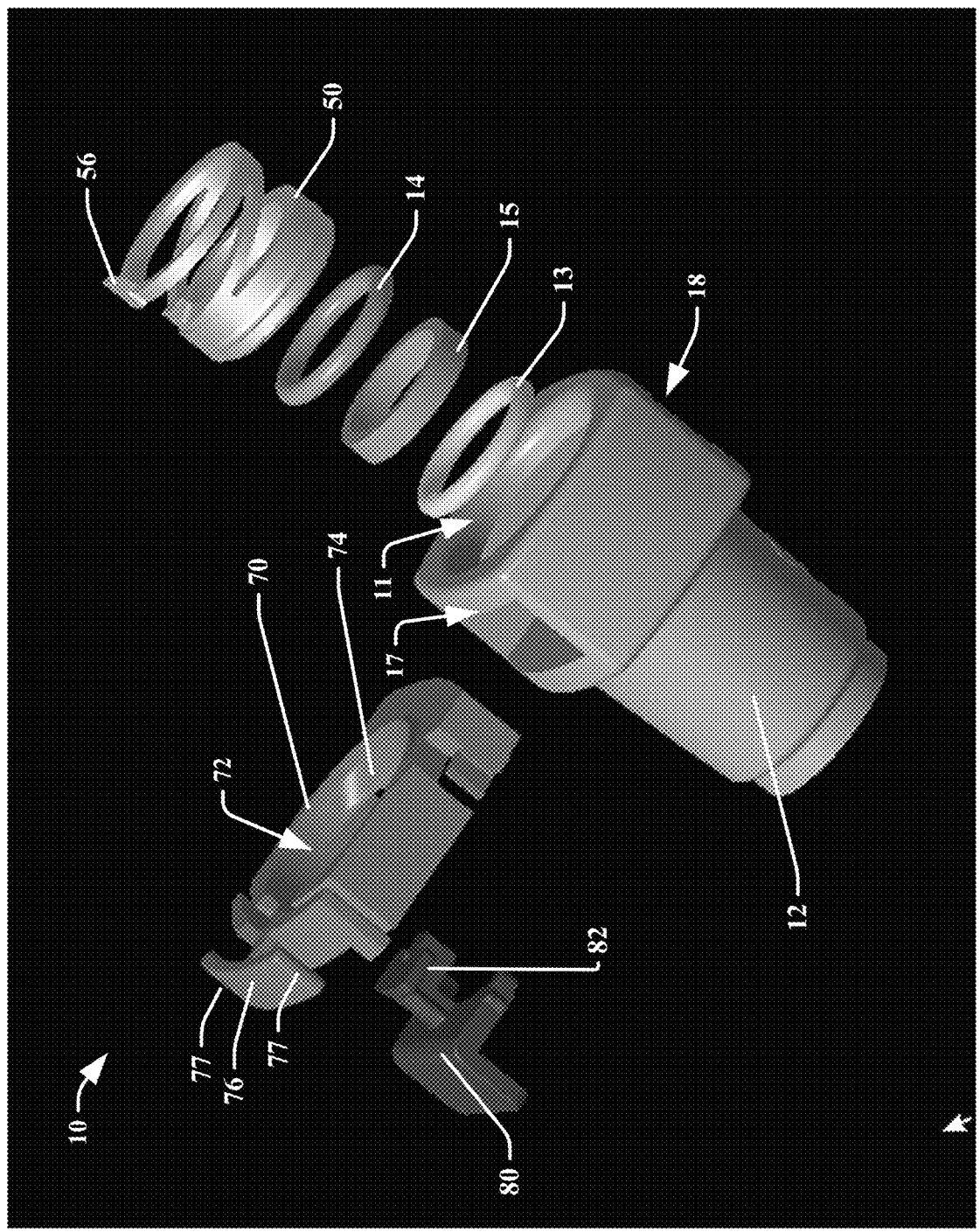
FIG. 17 is an exploded view of the housing of FIG. 15.
Figure 18:
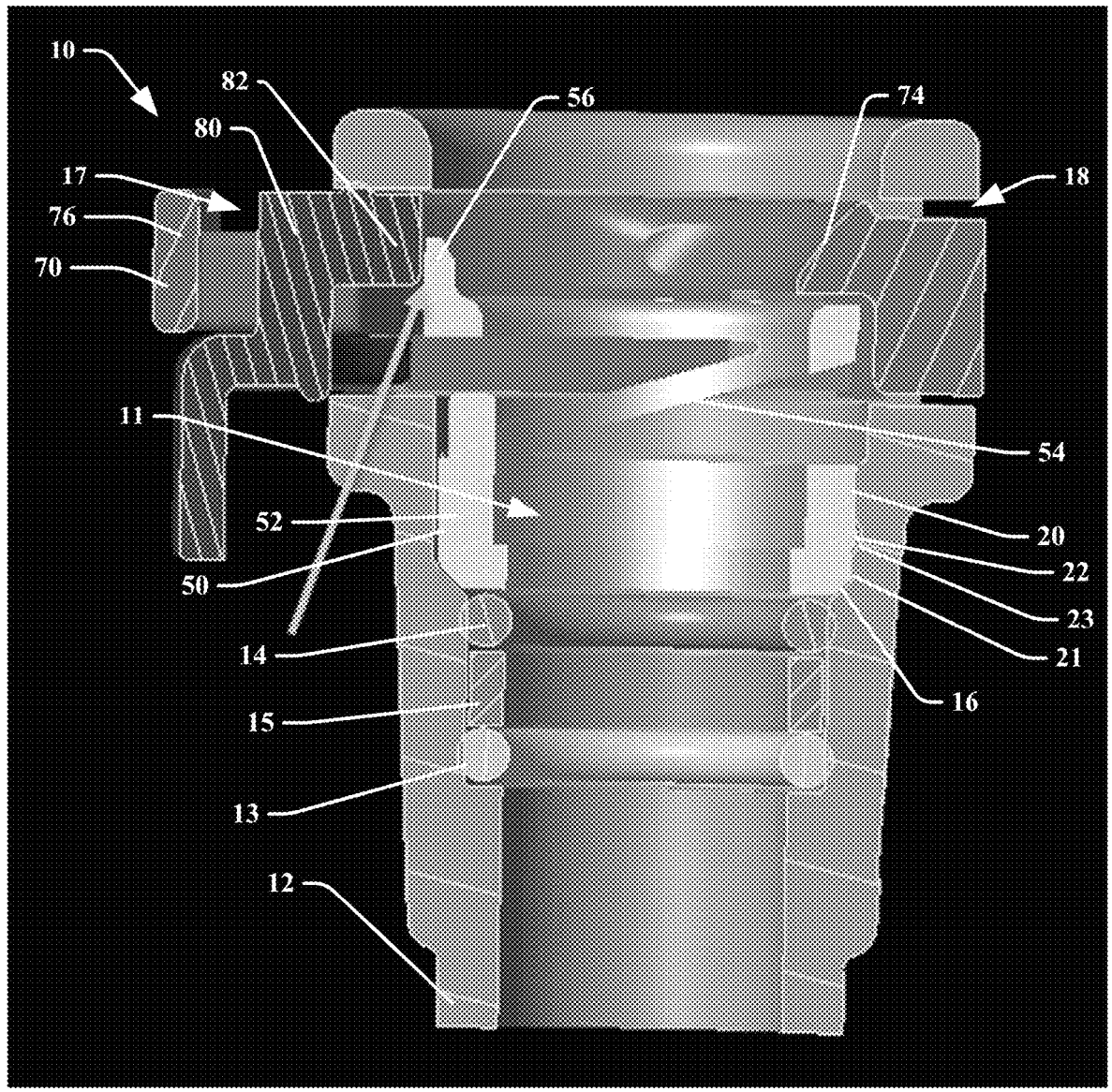
FIG. 18 is a longitudinal cross sectional view of the housing of the quick connect assembly of the present disclosure.

With reference to FIGS. 2 and 14, the primary latch 70 may include a ring shape body that defines a primary cavity 72 configured to receive a portion of the male member 90 therethrough. The primary cavity 72 is at least partially defined by an abutment surface or surfaces 74 of the primary latch 70. The abutment surface 74 and the primary cavity 72 may be positioned within the primary slot 17 of the housing 10 and be generally aligned with the cavity 11 of the housing 10 to allow a portion of the male member 90 to be received therein. The primary latch 70 may translate between engaged and non-engaged positions within the primary slot 17. Further, in one embodiment, the primary latch may also include at least one primary bias member 76 that allows the primary latch 70 and abutment surface 74 to be biased at least partially between the engaged position and the disengaged position. Generally, the primary bias member 76 maintains the primary latch 70 in the static position which is the engaged position. Here, the abutment surface 74 may be placed at least partially within the line of travel of at least the enlarged portion 140 of the male member 90. As a user depresses the primary bias member 76 to translate the primary latch to the disengaged positon, the abutment surface 74 may be moved out of the line of travel of the enlarged portion 140 of the male member 90. Notably, in an embodiment, the primary latch 70 and the secondary latch 80 may be toggled to translate along a direction that is generally normal relative to the axis along which the flow of fluid is to travel through the cavity 11. This action places the primary latch 70 and secondary latch 80 in either the engaged position to retain the enlarged portion 140 of the male member 90 or the disengaged position to allow the male member 90 to be withdrawn from the female connector 10.

In an embodiment, the primary bias member 76 and the abutment surface 74 may be formed of a generally continuous material to form the primary latch 70. The primary bias member 76 may include elongated legs 77 that extend from a central attachment portion 78 wherein opposing ends of the elongated legs 77 may be configured to abut against an outer surface of the housing 10 to impart the bias force thereon. Further, the abutment surface 74 may be a ramped surface that extends radially about a portion of the perimeter of the inner cavity 72. Further, the abutment surface 74 may be positioned along an opposite side of the primary latch 70 than the primary bias member 76. In operation, a user may depress the primary bias member 76 to slightly translate the primary latch 70 from the engaged position to the disengaged position while also translating the male member 90 out of (or into) the cavity 11 of the housing 10. Further, when inserting the male member 90 into the cavity 11, the enlarged portion 140 may abut against and slide against the abutment surface 74 to assist with translating the primary latch 70 from the engaged to disengaged positions to allow the male member 90 to be placed therein. As such, the primary bias member 76 may provide a bias force to place the primary latch in the engaged position that may be overcome by forcing the male member 90 and enlarged portion 140 against the abutment surface 74 to insert the male member from the cavity.

The secondary latch 80 may include a body 81 in which the secondary engagement member 82 and the elongated legs extends. The body 81 may include a surface ridge 85 that allows a user to easily grasp to pull the secondary latch 80 from the engaged positon to the disengaged position or to press to the secondary latch 80 from the disengaged position to the engaged position. The secondary engagement member 82 may extend from the body 81 and be configured to extend towards the cavity 11 and the path of fluid. The legs 88 may extend from the body 81 from opposing sides and be configured to extend within the cavity 11 and be placed outside the path of fluid. The secondary engagement member 82 may extend from at top portion of the body 81 and be aligned with the space 84 within the opposing wall 92 of the primary latch 70. The legs 88 may extend from a portion of the body that is axially spaced from but generally parallel to the secondary engagement member 82.

Referring to FIG. 7, once the male member 90 is at least partially positioned within the cavity 11 of the housing 10, the enlarged portion 140 of the male member 90 may at least partially depress against or otherwise translate passed the abutment surface 74 of the primary latch 70. Notably, in a static state, the primary latch 70 may be in the engaged position while the abutment surface 74 may be aligned within the cavity 11. The primary bias member 76 may apply a bias force to the primary latch 70 to maintain the primary latch in the engaged position. When the abutment surface 74 is engaged with a portion of the enlarged portion 140 of the male member 90, the primary latch 70 may be biased a direction generally normal relative to the fluid flow axis of the cavity 11 of the female connector 10 to allow the male member 90 to translate closer within the cavity 11 of the female connector 10. Alternatively, a user may depress the primary bias member 76 to allow the enlarged portion 140 to translate passed the abutment surface 74 of the primary latch 70.

Further, in the static position, the blocking member 56 may be positioned at least partially within a space 84 (See FIGS. 3, 10, and 14) in general alignment with the abutment surface 74 of the primary latch 70 (See FIG. 6). The space 84 may be split between the abutment surface 74 and be a continuation of the primary cavity 72.

As the enlarged portion 140 of the male member 90 translates along the direction of fluid flow within the cavity 11 and towards the housing 10, as illustrated by FIG. 7, a portion of the male member 90 is positioned within the O-rings 13, and 14, the retention sleeve 15, the retention sleeve member 50, the base 52, the biasing portion 54, and the primary cavity 72 of the primary latch 70. Here, the enlarged portion 140 is shown to have already abut against the abutment surface 74 of the primary latch 70 whereas the primary latch is shown to be depressed "down" per the annotated white arrow. The secondary latch 80 remains in the disengaged position. Once passed the abutment surface 74, the enlarged portion 140 engages against the surface 59 of the retention sleeve member 50. At this point, the secondary latch 80 may still be in the disengaged position and may be prevented from translating to the engagement position as the blocking member 56 remains in its static position or blocking position preventing further translation of the secondary engagement member 82 of the secondary latch 80.

As illustrated by page 8, as the male member 90 is fully positioned within the housing 10, the enlarged portion 140 has abutted against the surface 59 of the retention member 50 and has translated the biasing portion 54 towards the base 52. This action may cause the blocking member 56 to translate away from its blocking engagement with the secondary engagement member 82 of the secondary latch 80. The blocking member 56 may be moved from within the space 84 (FIG. 4) aligned with the abutment surface 74 of the primary latch 70. The primary latch 70 may also bias back to its static position in which the abutment surface 74 is aligned in the engaged position relative to the enlarged portion 140. A portion of the primary latch 70 (i.e., the primary bias member 76) may be in a "popped" out" position as a portion of the abutment surface 74 retains the enlarged portion 140 of the male member 90 within the cavity 11 of the housing 10. This "popped out" position may provide visual and tactical indication that the primary latch 70 is in the engaged position and that the secondary latch 80 may now be actuated between the engaged position and the disengaged position.

FIG. 8 illustrates the secondary latch 80 positioned in the engaged position where the secondary engagement member 82 is translated towards the cavity 11 to retain the enlarged portion 140 of the male member 90 within the housing 10. Here, the quick connect assembly 100 provides a redundant level of attachment wherein both the secondary engagement member 82 of the secondary latch 80 and the abutment surface 74 of the primary latch 70 prevent the male member 90 from being removed from the housing 10 while the male member 90 is able to rotate within the cavity 11.

Here, the secondary engagement member 82 and abutment surface 74 are generally aligned along a common plane to prevent the removal of the male member 90 from opposing sides of the housing 10. This arrangement may provide a desirable and structurally sound fluid connection.

FIGS. 9-13 illustrate various cross sectional views of the male member 90 and the female connector member 10 along with the primary latch 70 and secondary latch 80. It illustrates various features including how the primary latch 70 is positioned along an opposite side from the secondary latch 80 relative to the housing 10 (co-planar orientation) along with various retaining members and shoulder support surfaces of each component.

Figure 9:
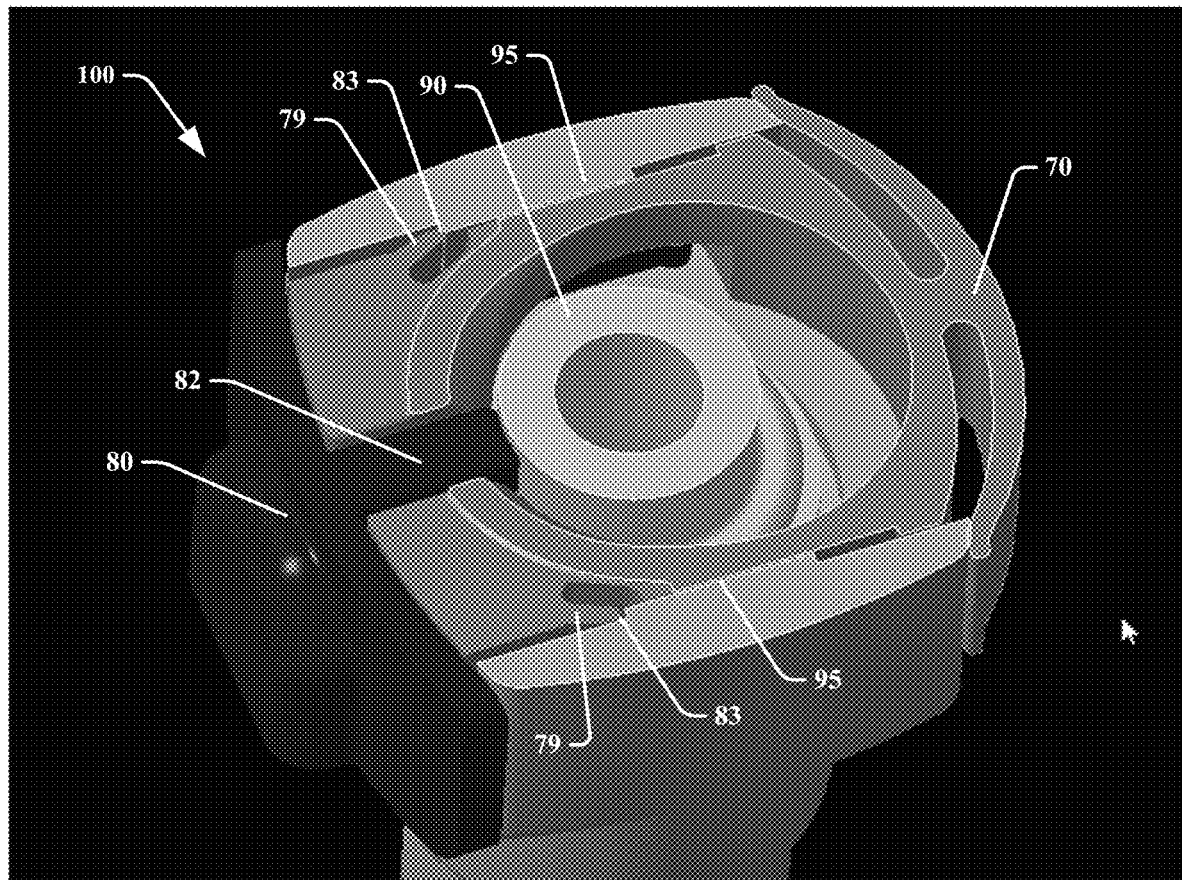
FIG. 9 is an axial cross sectional view of the male member positioned within the housing with the primary latch and the secondary latch in a closed/engaged position according to the present disclosure.

Further, in one embodiment as illustrated by FIG. 9, the primary latch may also include at least one primary leg member 79 that allows the primary latch to be positioned in the housing 10 through the primary slot 17 or the opposite secondary slot 18. The leg members 79 may be positioned along a top surface of the primary latch and allow the primary latch 70 to be snap fit within the housing 10 and prevent the primary latch 70 from being dislodged from the housing 10 when the male member 90 is not attached thereto. The leg member 79 may abut against ledges 83 positioned along an inner surface of the housing 10 to allow for this snap fit orientation. When inserted into the housing 10, the leg members 79 may abut against a surface protrusion 95 along an inner side wall surface of the housing and bias towards the cavity 11. The surface protrusions 95 may be along either or both sides of the inner side wall surfaces of the housing and also define the ledges 83. Notably, this configuration can allow the primary latch to be received through either the primary slot 17 or the secondary slot 18. Once the leg members 79, in the biased state, reach the ledges 83, the leg members 79 bias back to static position and may abut against the ledges 83 to be maintained therein.

Figure 10A:
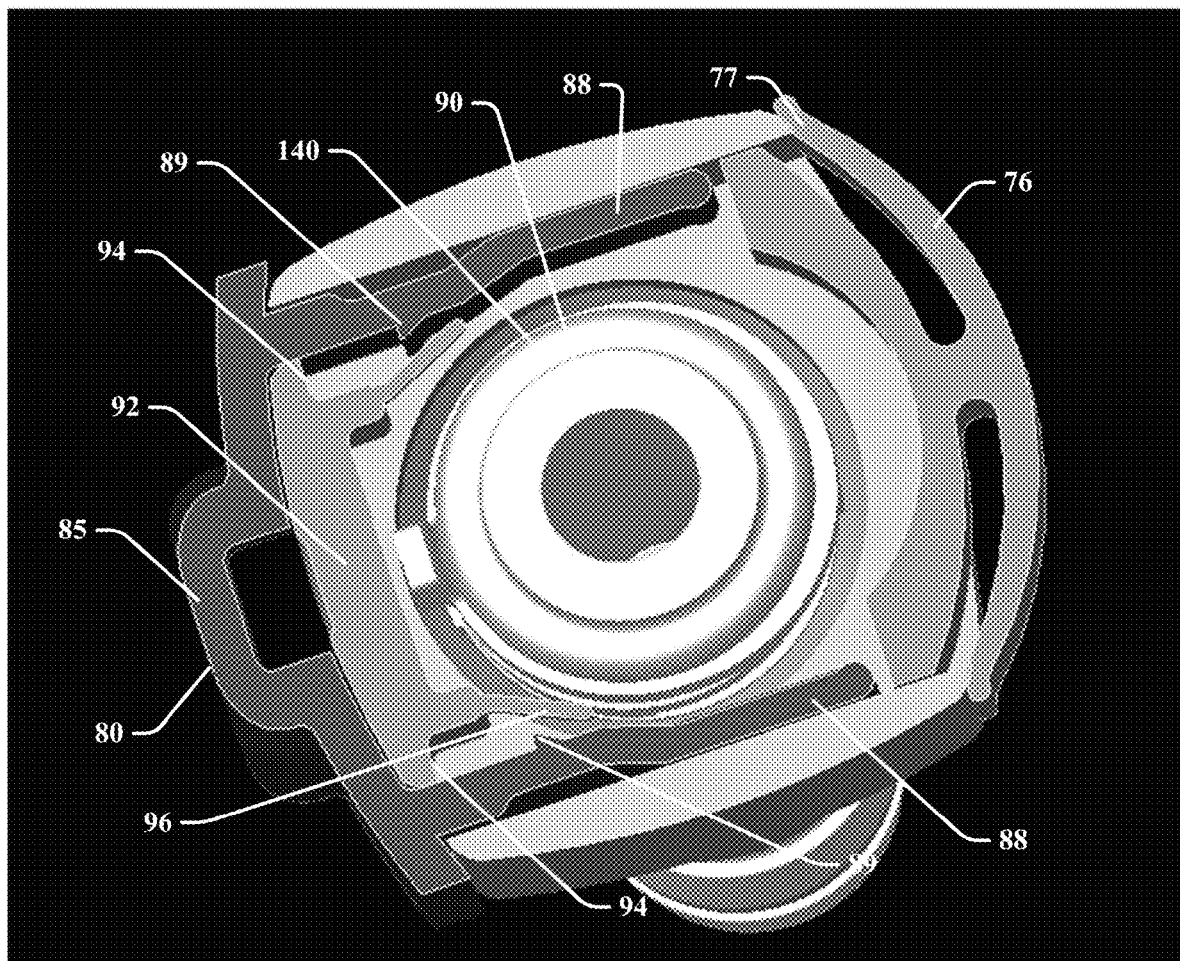
FIG. 10A is an axial cross sectional view of the male member positioned within the housing with the primary latch and the secondary latch in a closed/engaged position according to the present disclosure.
Figure 10B:
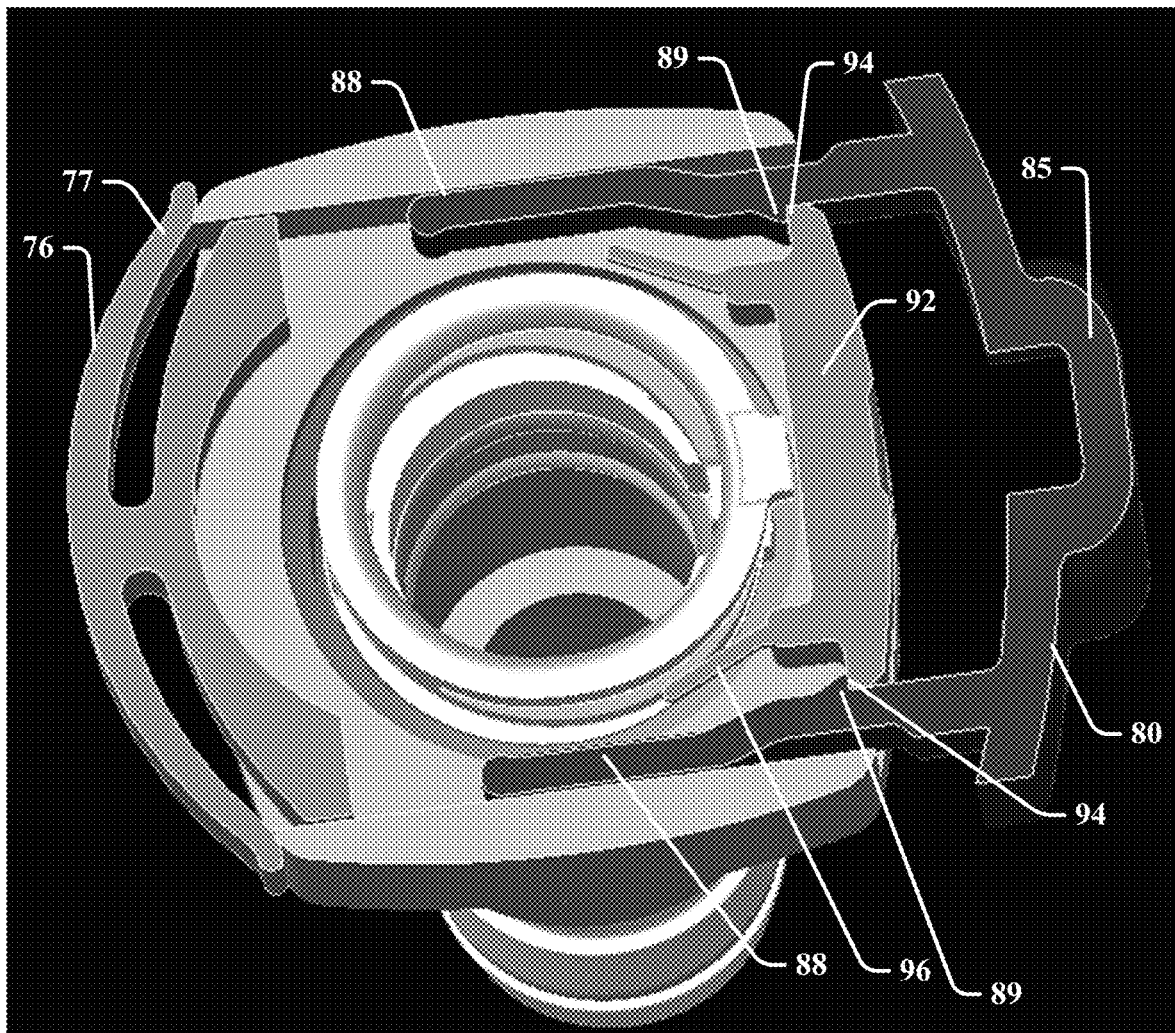
FIG. 10B is an axial cross sectional view of the housing with the primary latch in a closed/engaged position and the secondary latch in the open/disengaged position according to the present disclosure.
Figure 12:
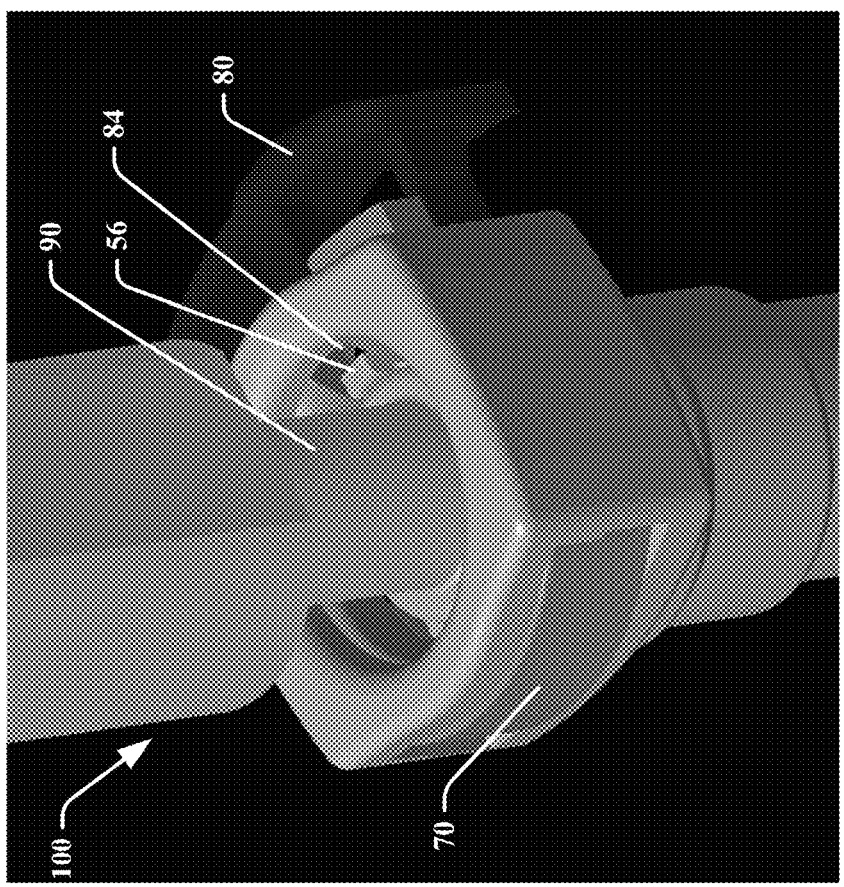
FIG. 12 is a perspective view of the male member positioned within the housing with the primary latch in the closed position and the secondary latch in the open position according to the present disclosure.
Figure 11:
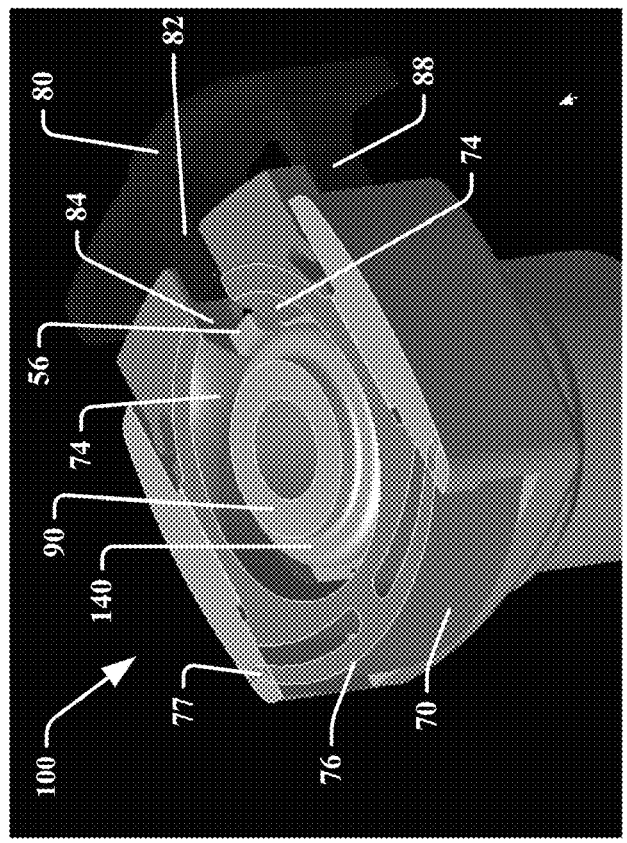
FIG. 11 is a partial cross sectional view of the male member positioned within the housing of the quick connect assembly with the primary latch in the closed position and the secondary latch in the open position according to the present disclosure.
Figure 13:
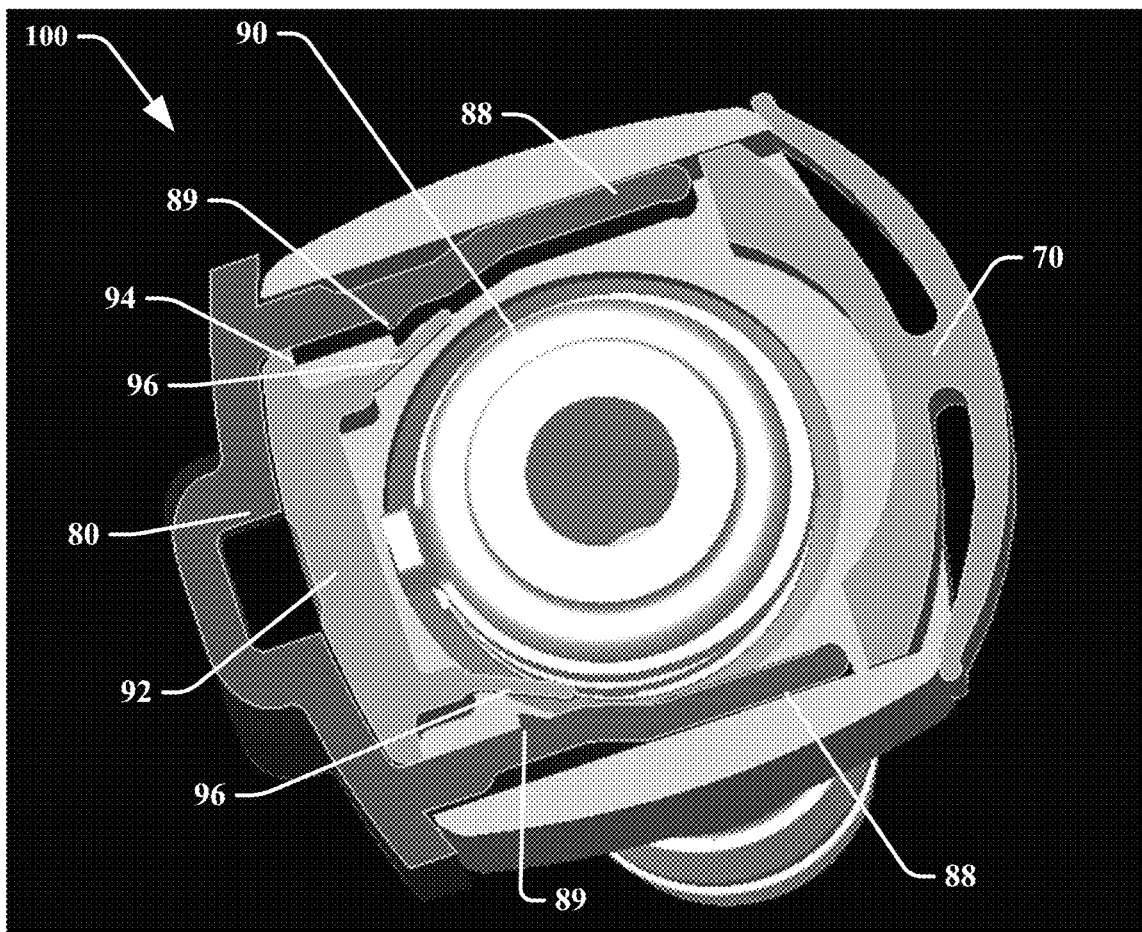
FIG. 13 is a partial cross sectional view of the male member positioned within the housing with the primary latch and the secondary latch in the closed position according to the present disclosure.

Additionally, the secondary latch member 80 may be configured to translate and interact with the geometry of the primary latch member 70 when positioned within the housing 10. As illustrated by FIGS. 10A and 10B, the secondary latch 80 may include legs 88 and protrusions 89 positioned along opposing sides of the latch 80 that are configured to be received within the secondary slot 18 of the housing as well as interact with surfaces of the primary latch member 70. The primary latch 70 may include an opposing wall 92 that is configured to fit between the legs 88 of the secondary latch 80 and also includes the space 84 located therein. As described above, the space 84 may be for receiving the secondary engagement member 82. The configuration of the opposing wall 92 may allow for the legs 88 to be axially spaced from the engagement member 82, to extend along a generally parallel axial plane, and be inserted into the secondary slot 18. The legs 88 may include inward facing protrusions 89 that may interact with a stop surface 94 along the opposing wall 92 wherein the legs 88 are configured to allow the secondary latch 80 to be translated between the engaged position (protrusions 89 spaced from stop surfaces 94 per FIG. 10A) and disengaged position (protrusions 89 abut with stop surfaces 94 per FIG. 10B). The legs 88 may be generally elongated and be positioned along either side of the cavity 11 when inserted. Further, the primary latch 70 may include guide arms 96 that may assist to guide the elongated legs 88 of the secondary latch into place within the housing. The guide arms may extend from the opposing wall 92 or surface of the primary latch 70 and be generally angled to allow the legs 88 from extending within the cavity 11 and conflicting with the fluid path configured to receive the male member 90. The guide arms 96 may allow for slight warpage of the legs of the secondary latch 80 due to manufacturing tolerances or material bending issues. The legs 88 may be snap fit therein. Further, the protrusions 89 may be configured to abut against the stop surface 94 to prevent the secondary latch 80 from being dislodged from the housing 10.

However, this disclosure also contemplates that the secondary latch 80 may also be aligned along and positioned along the same side of the housing 10 as the primary latch 70. This embodiment is illustrated by FIGS. 15-23 which includes similar reference numbers as the features illustrated by FIGS. 1-14 but the primary latch 70 and secondary latch 80 are positioned in such a way as to allow the latches to move between engaged positions and non-engaged positions from the primary slot 17 along a common side of the assembly.

Here, the primary latch 70 and secondary latch 80 may be configured to interact with one another and with the housing 10 to allow the primary latch 70 to be positioned in an engaged position about the male member 90. The male member 90 is configured to abut the surface 59 of the retention sleeve member 50 and bias the blocking member 56 towards the base 52 and out of alignment with the primary slot 17 and away from abutment with the secondary engagement member 82. This would allow the secondary latch 80 to be positioned in the engaged position and to abut against the enlarged portion 140 of the male member 90 preventing its removal. The primary latch 70 may then also bias back to or otherwise be translated towards its static position in which the abutment surface 74 is aligned in the engaged position relative to the enlarged portion 140. This provides a redundant level of attachment as both the primary and secondary latches prevent withdrawal of the male member 90 from the housing 10.

Figure 19:
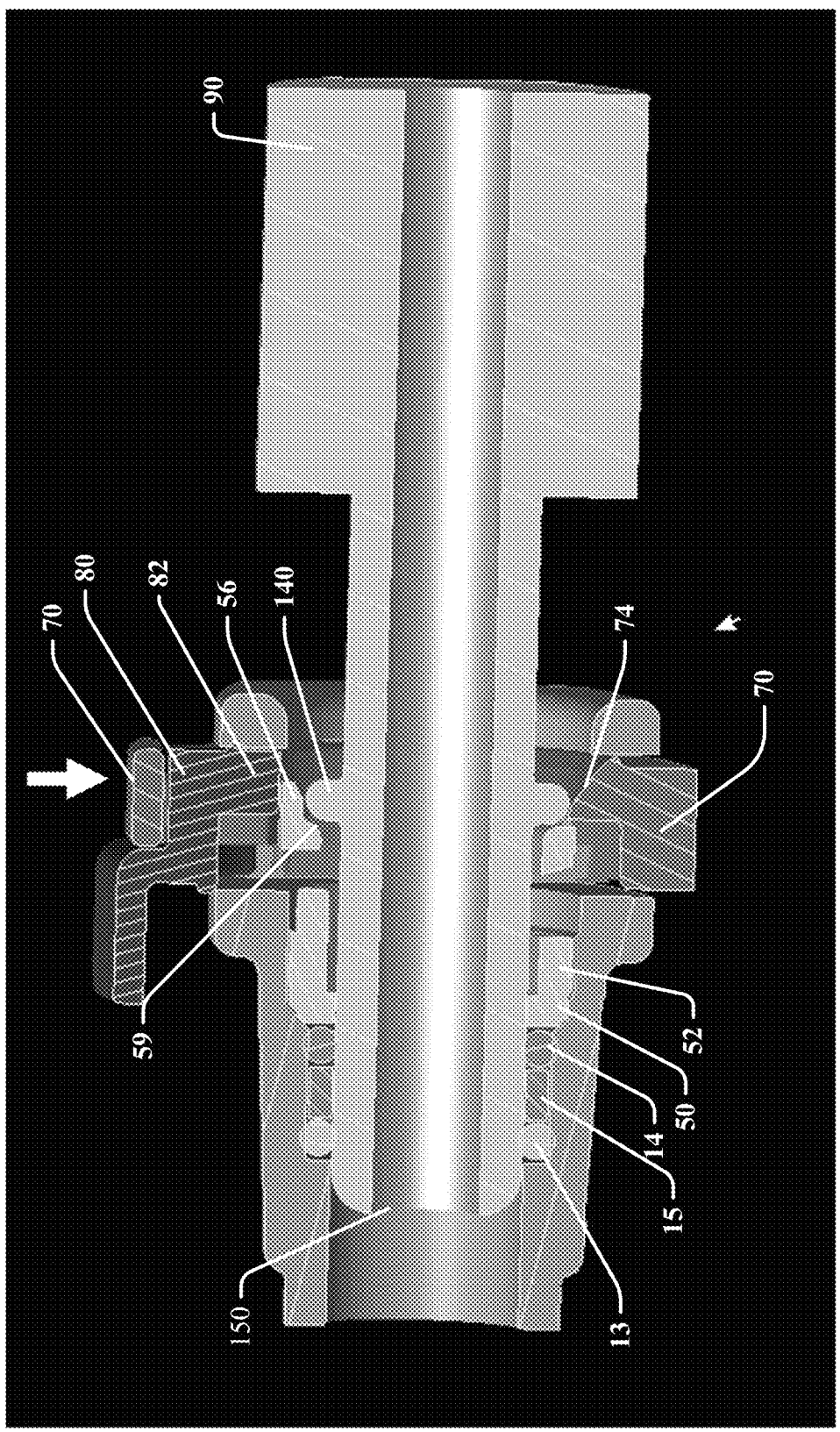
FIG. 19 is a longitudinal cross sectional view of a male member translating to be positioned within the housing with the primary latch and the secondary latch in an opened position according to the present disclosure.

FIG. 19 illustrates how the male member 90 may be translated into the housing from a "right to left" assembly stroke perspective. Here, the primary latch 70 has been depressed "down" as illustrated by the annotated arrow and the enlarged portion 140 is beginning to engage the surface of the In an embodiment, a portion of the primary latch 70 may be in a "popped" out" position as a portion of the abutment surface 74 retains the enlarged portion 140 of the male member 90 within the housing 10. This "popped out" position may provide visual and tactical indication that the primary latch 70 is in the engaged position and that the secondary latch 80 may now be actuated between the engaged position and the disengaged position.

Figure 20:
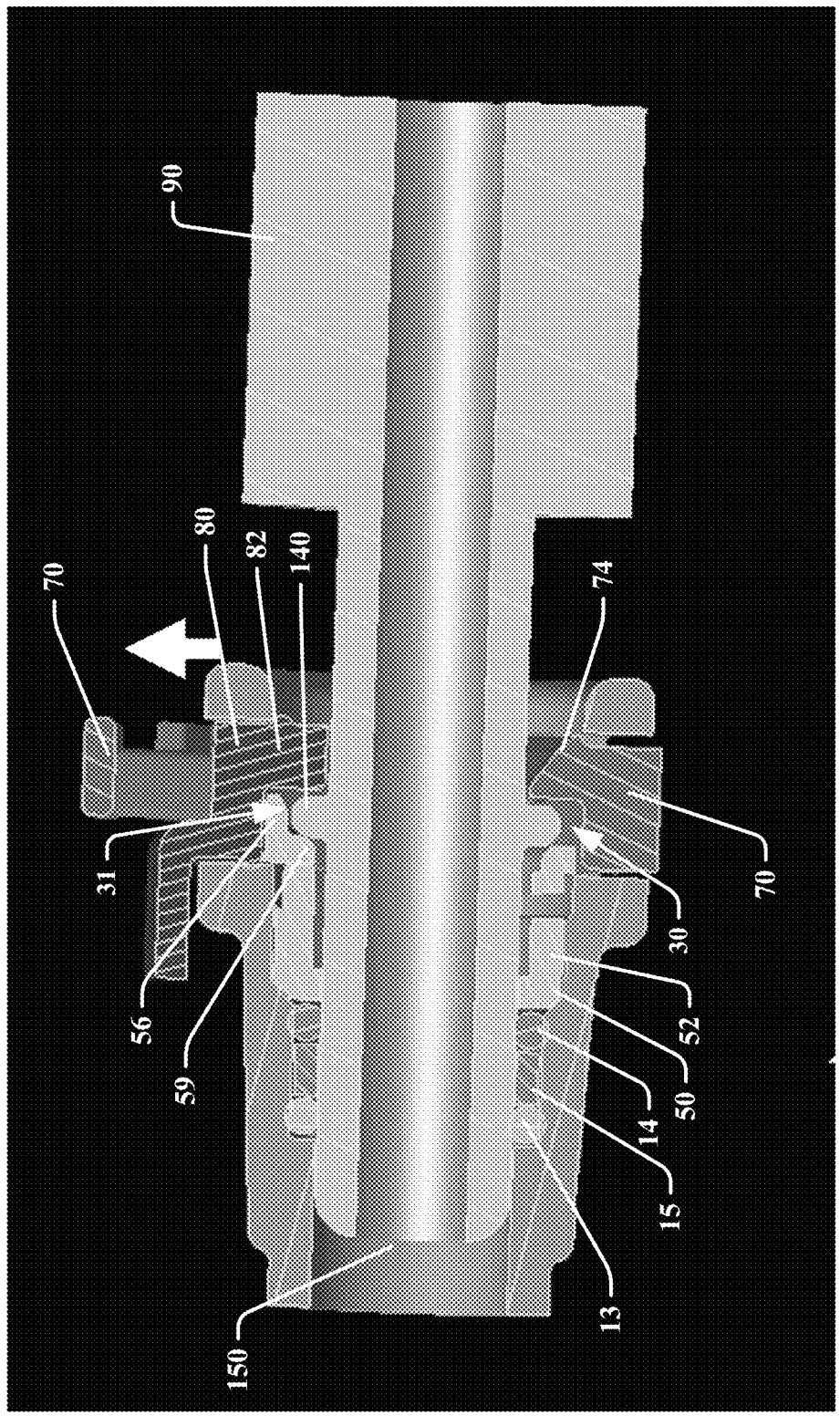
FIG. 20 is a longitudinal cross sectional view of the male member positioned within the housing with the primary latch and the secondary latch in a closed position according to the present disclosure.
Figure 21:
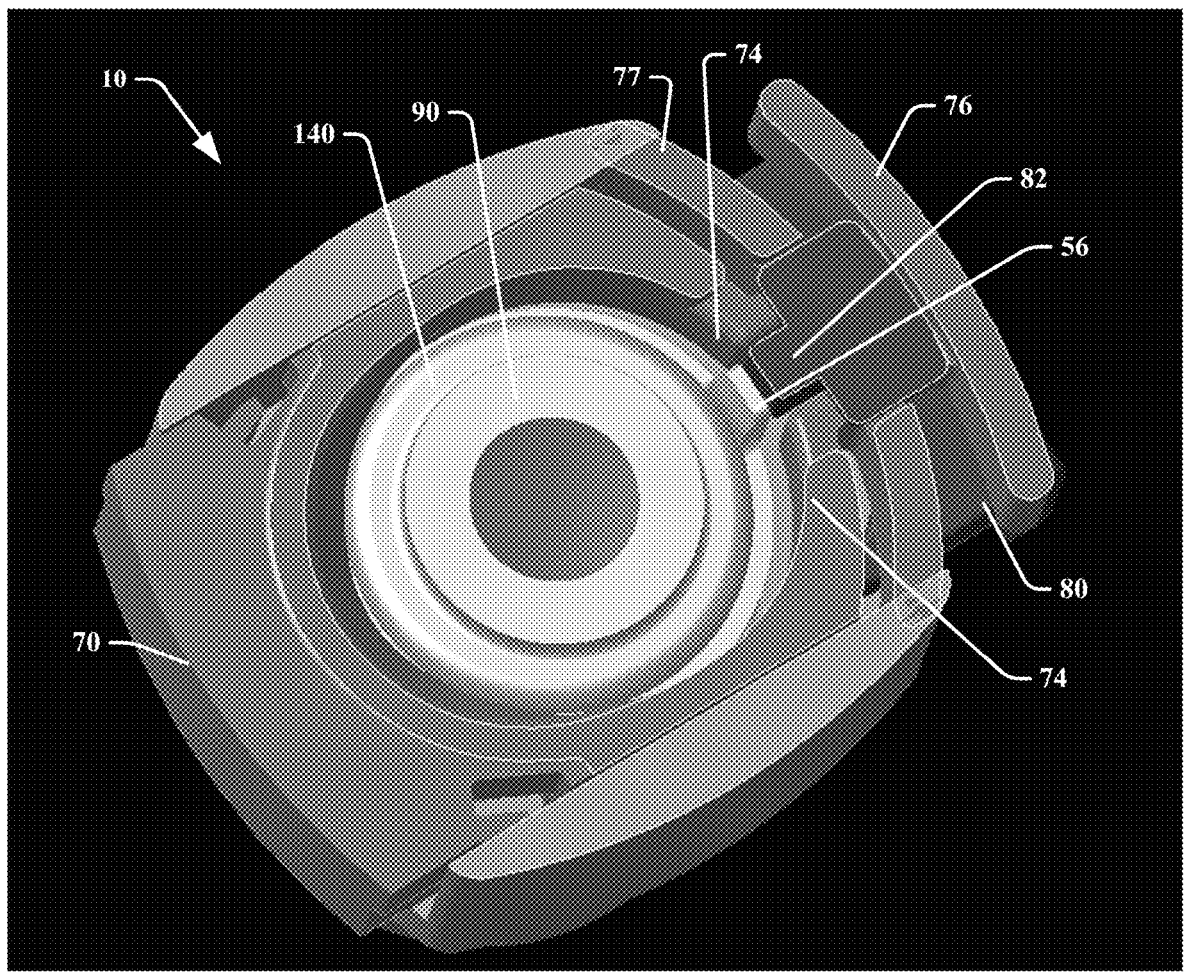
FIG. 21 is an axial cross sectional view of the male member positioned within the housing with the primary latch and the secondary latch in the open position according to the present disclosure.
Figure 23:
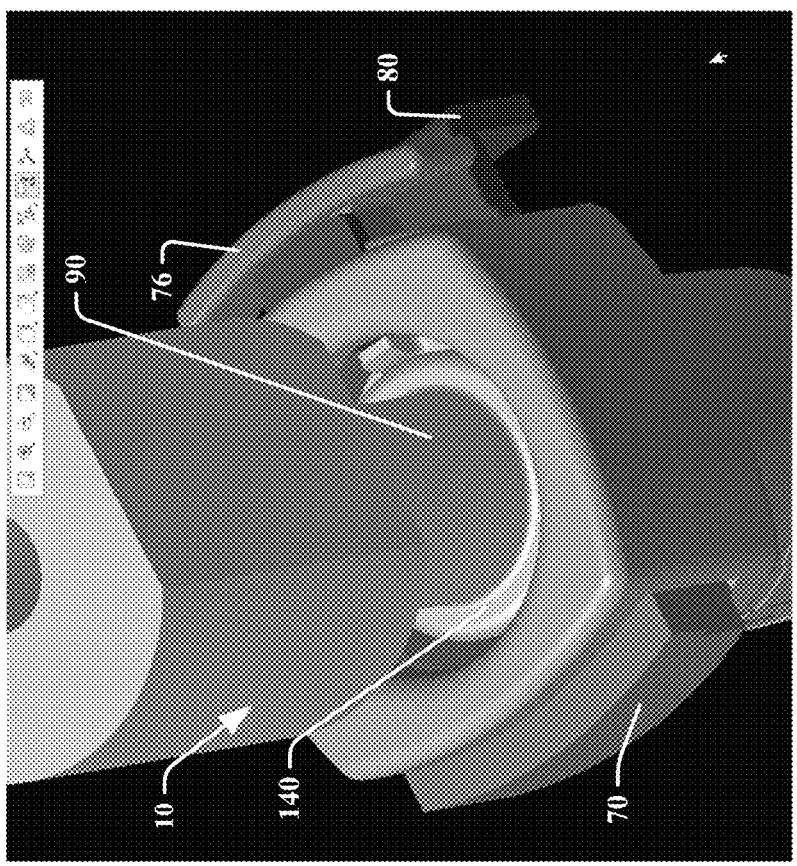
FIG. 23 is a perspective view of the male member being positioned within the housing according to the present disclosure.
Figure 22:
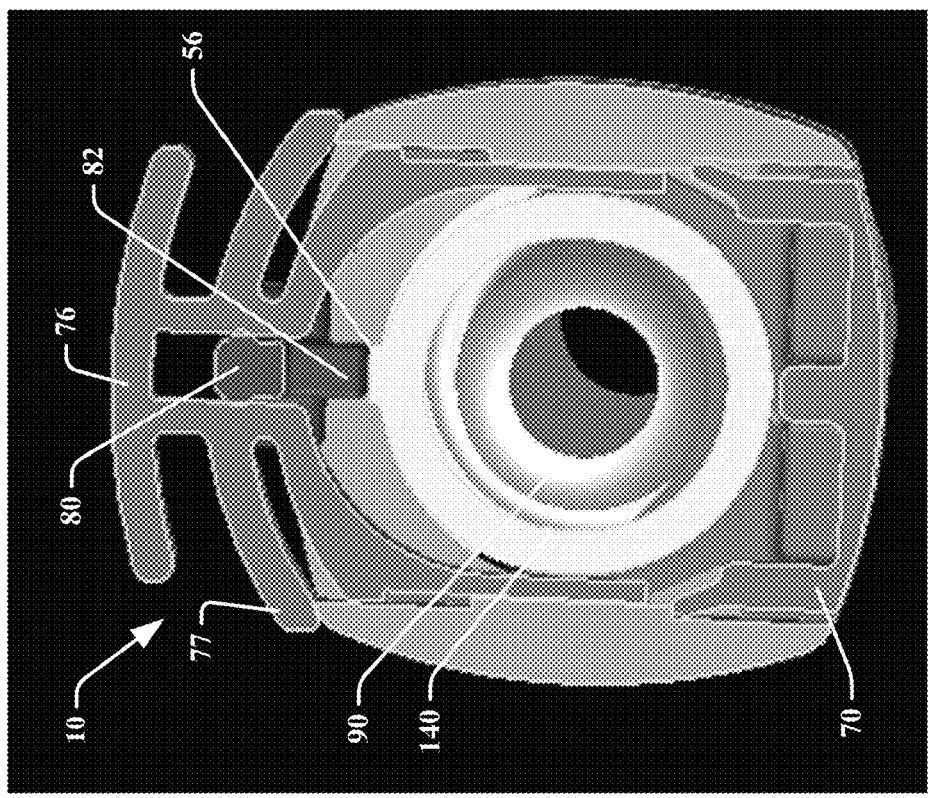
FIG. 22 is a partial cross sectional view of the male member being positioned within the housing according to the present disclosure.

Also, this embodiment allows for the secondary latch 80 to retain a first portion 30 of the enlarged portion 140 and the primary latch 90 to retain an opposite second portion 31 of the enlarged portion 140 as illustrated by FIG. 20. Here, the secondary engagement member 82 and abutment surface 74 are generally aligned along a common plane to prevent the removal of the male member 90 from opposing sides of the housing 10. This arrangement may provide a desirable and structurally sound fluid connection.

Stated another way, the action of the primary and secondary latches may interact to allow for a visual, audible, and/or tactile indication about the secure attachment between a male member and a female connector member as described herein. Notably, the abutment or engagement of surfaces against the bias force of components described herein may provide the audible or tactile indication of a secured engagement or disengagement of such components.

Further, the secondary latch may be prevented from being engaged by a ring (blocking member) that is moved to a non-interfering location by the axial engagement of the male member. The ring or blocking member may be tabbed and made integral with a molded spring to an O-ring retention member forming a combo unit. The resulting assembly provides a quick connect assembly that provides smaller packaging space than known quick connect assemblies which allows for additional space within complicated systems in which space is valued.

Additionally, it may be possible to install the primary latch and the secondary latch from either side of the female housing. As such, both the primary latch can be inserted into the primary slot 17 or the secondary slot 18 and the secondary latch 80 can be inserted into the opposite side of the primary latch 70. This is particularly advantageous with female connectors that are greater than 0 degree connections, for example 90 degrees. This configuration allows tailoring of the connection to the actual in-vehicle assembly method and is an improvement over known quick connect assemblies.

Although the embodiments of the present disclosure have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A quick connector assembly comprising:
a tubular housing, defining a lumen extending along an axis, having: a first open end with a larger inner diameter than an opposing second open end, a slot passing through a sidewall of the housing, and a shoulder on an inner facing of the lumen;
a retaining sleeve, coaxially received within the housing and conforming to the housing to define a portion of the lumen, having: a base seated on the shoulder, a axially compressible, biasing midsection extending toward the first open end, and an upper abutment including a blocking member; and
a latching assembly, seated in the slot, having: a body defining a central aperture, a primary latching mechanism, and a secondary latching mechanism including a slidable member, wherein the central aperture and the primary latching mechanism each conform to the housing to define a section of the lumen and wherein the slidable member selectively translates through the slot to engage the blocking member when the biasing midsection is compressed.

2. The assembly of claim 1 wherein the slot extends completely through a first sidewall and an opposing sidewall of the housing along an angle that is substantially perpendicular to the axis and wherein the first primary latching mechanism is seated in the first sidewall and the slidable member translastes through the opposing sidewall.

3. The assembly of claim 2 wherein the primary latching mechanism includes at least one elongated biasing leg.

4. The assembly of claim 2 wherein the secondary latching mechanism includes at least one extension leg extending parallel to the slidable member.

5. The assembly of claim 4 wherein the at least one extension leg includes an angled terminal end and wherein the at least one extension leg snap fits onto a corresponding feature on the primary latch.

6. The assembly of claim 1 further comprising at least one o-ring positioned adjacent to the retaining sleeve along the inner facing of the lumen.

7. The assembly of claim 1 wherein the secondary latch translates along a mating surface of the primary latch so that the latching assembly is received in one slot formed in one section of the sidewall.

8. The assembly of claim 7 wherein the primary and secondary latching mechanisms are aligned along a common side on the housing so that the one slot is disposed only in the common side.

9. The assembly of claim 1 further comprising a hose member, received coaxially through the first open end, having: a radially enlarged portion configured to engage and compress the upper abutment and a first facing of the enlarged portion, wherein the slidable member engages and retains an opposing facing of the enlarged portion when the biasing midsection is sufficiently compressed.

10. The assembly of claim 9 wherein the hose member extends axially down into the lumen so that a lower terminal edge of the hose member is positioned at an elevation below the shoulder.

11. The assembly of claim 1 wherein the upper abutment terminates at an elevation that coincides with the slot.

12. The assembly of claim 1 wherein a portion of the latching assembly extends radially to a maximum distance from an exterior of the housing to indicate the slidable member is disengaged.

13. A quick connector assembly comprising:
a tubular housing, defining a lumen extending along an axis, having: a first open end with a larger inner diameter than an opposing second open end, a slot passing through a sidewall of the housing, and a shoulder on an inner facing of the lumen;
a retaining sleeve, coaxially received within the housing and conforming to the housing to define a portion of the lumen, having: a base seated on the shoulder, a axially compressible, biasing midsection extending toward the first open end, and an upper abutment including a blocking member;
a latching assembly, seated in the slot, having: a body defining a central aperture and a slidable member, wherein the central aperture conforms to the housing to define a section of the lumen and wherein the slidable member selectively translates through the slot to engage the blocking member when the biasing midsection is compressed; and
wherein the base includes at least one axially extending spacer configured to limit axial movement of the blocking member when the biasing midsection is compressed.

14. The assembly of claim 13 wherein the retaining sleeve includes a radial protrusion extending away from the base configured to engage the shoulder.

15. The assembly of claim 13 wherein the retaining sleeve includes an indexing notch conforming to a cooperating feature on the inner facing of the lumen.

16. A quick connector assembly comprising:
a tubular housing, defining a lumen extending along an axis, having: a first open end with a larger inner diameter than an opposing second open end, a slot passing through a sidewall of the housing, and a shoulder on an inner facing of the lumen;
a retaining sleeve, coaxially received within the housing and conforming to the housing to define a portion of the lumen, having: a base seated on the shoulder, a axially compressible, biasing midsection extending toward the first open end, and an upper abutment including a blocking member;
a latching assembly, seated in the slot, having: a body defining a central aperture and a slidable member, wherein the central aperture conforms to the housing to define a section of the lumen and wherein the slidable member selectively translates through the slot to engage the blocking member when the biasing midsection is compressed; and
a retention annulus defining a portion of the lumen and positioned at an elevation below the retaining sleeve.

17. The assembly of claim 16 wherein a plurality of o-rings are positioned axially above and below the retention annulus.

* * * * *